US011774355B1

(12) United States Patent
Aslam et al.

(10) Patent No.: US 11,774,355 B1
(45) Date of Patent: Oct. 3, 2023

(54) SYSTEM, APPARATUS AND METHODS FOR DETECTING METHANE LEAK

(71) Applicant: United States of America as represented by the Administrator of NASA, Washington, DC (US)

(72) Inventors: Shahid Aslam, Washington, DC (US); Gerard Quilligan, Gulf Breeze, FL (US); Nicolas Gorius, Washington, DC (US); Conor Nixon, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 423 days.

(21) Appl. No.: 17/161,814

(22) Filed: Jan. 29, 2021

Related U.S. Application Data

(60) Provisional application No. 62/970,404, filed on Feb. 5, 2020.

(51) Int. Cl.
  *G01N 21/3504* (2014.01)
  *G08B 21/14* (2006.01)
  *G01J 3/42* (2006.01)

(52) U.S. Cl.
  CPC ............ *G01N 21/3504* (2013.01); *G01J 3/42* (2013.01); *G08B 21/14* (2013.01); *G01J 2003/421* (2013.01)

(58) Field of Classification Search
  CPC .... G01N 21/31; G01N 21/3504; G01N 21/39; G01J 3/42; G01J 2003/421; G08B 21/14
  See application file for complete search history.

(56) References Cited

U.S. PATENT DOCUMENTS

| | | | |
|---|---|---|---|
| 9,612,195 B1* | 4/2017 | Friedman | G08B 21/14 |
| 2002/0153490 A1* | 10/2002 | O'Leary | G01N 21/3504 |
| | | | 250/353 |
| 2006/0202122 A1* | 9/2006 | Gunn | E21B 21/01 |
| | | | 250/339.13 |
| 2010/0090845 A1* | 4/2010 | Polak | G08B 21/12 |
| | | | 250/341.8 |
| 2013/0070231 A1* | 3/2013 | Nauka | G01N 21/3504 |
| | | | 356/51 |
| 2019/0113445 A1* | 4/2019 | Zhang | G01W 1/02 |
| 2020/0072740 A1* | 3/2020 | Venturini | G01J 3/0208 |
| 2021/0063304 A1* | 3/2021 | Chambers | F23G 7/08 |

* cited by examiner

*Primary Examiner* — Orlando Bousono
(74) *Attorney, Agent, or Firm* — Trenton J. Roche; Heather Goo

(57) ABSTRACT

A methane alert station for detecting methane gas in an environment. The methane alert station comprises a casing, at least one window opening formed in the casing, a infrared transmitting window disposed in the at least one window opening, an infrared light source disposed adjacent to the infrared transmitting window, a hyperbolic mirror disposed in the casing coaxially with a central axis, a Winston cone disposed coaxially with the central axis and spaced from the hyperbolic mirror along the central axis, and a filter-detector arranged coaxially with the central axis and so that the Winston cone is disposed between the hyperbolic mirror and the filter-detector. The infrared light source is configured to emit an outgoing infrared light from the casing. The filter-detector is configured to measure a methane gas concentration in the environment by measuring an absorption of infrared radiation of the methane gas at specific wavelength bandwidths.

20 Claims, 13 Drawing Sheets

SYSTEM, APPARATUS AND METHODS FOR DETECTING METHANE LEAK

CROSS-REFERENCE TO RELATED APPLICATIONS AND CLAIM TO PRIORITY

This application is related to provisional application No. 62/970,404, filed Feb. 5, 2020 in the United States of America, the disclosure of which is incorporated herein and to which priority is claimed.

FIELD OF THE INVENTION

The present invention generally relates to methane ($CH_4$) gas detection systems and methods, and more particularly to methane alert stations and methods for detecting methane leaks and methane leak detection systems for monitoring environments having potential source(s) of methane leaks.

DESCRIPTION OF THE RELATED ART

According to the World Meteorological Organization, climate stabilization remains elusive, with increased greenhouse gas concentrations already increasing global average surface temperatures 1.1° C. above pre-industrial levels. Methane ($CH_4$) is one of the most important greenhouse gases that has strong impact on climate change. As of 2020, atmospheric emissions and concentrations of $CH_4$ continue to increase, making $CH_4$ the second most important human-influenced greenhouse gas in terms of climate forcing, after carbon dioxide ($CO_2$). The relative importance of $CH_4$ compared to $CO_2$ depends on its shorter atmospheric lifetime, stronger warming potential, and variations in atmospheric growth rate over the past decade where uncertainties arise from the variety of geographically overlapping $CH_4$ sources and from the destruction of $CH_4$ by short-lived hydroxyl radical (OH) chemistries.

To date, $CH_4$ emissions have contributed almost one quarter of the cumulative radiative forcing for $CO_2$, $CH_4$, and $N_2O$ (nitrous oxide) combined since 1750 (pre-industrial). Although methane is far less abundant in the atmosphere than $CO_2$, it absorbs thermal infrared radiation much more efficiently and, as a consequence, has a global warming potential ~86× stronger per unit mass than $CO_2$ on a 20-year timescale and 28× more powerful on a 100-year time scale according to the Intergovernmental Panel on Climate Change (IPCC) "Mitigation of Climate Change. Contribution of Working Group III to the Fifth Assessment Report, 2014."

According to the Global Carbon Project and scientific literature, wetlands contribute 30% to methane global emissions. The overall increase is primarily due to human activities (anthropogenic), especially agriculture and fossil fuels. Specifically, the biggest increases, over 2000-2006 to 2017, are from raising livestock, coal mining, waste disposal in landfills, and gas and oil production. Agriculture, including enteric formation and manure management, account for 24% of total global emissions, landfills account for 11%, with oil, gas, and coal activities accounting for 20%. Geographically, 64% of global emissions came from tropical regions of South America, Asia, and Africa, with temperate regions accounting for 32% and the Arctic contributing 4%. It is clear that additional monitoring and mitigation strategies are needed to track anthropogenic $CH_4$ emissions in order to curb global warming.

There are currently about 2 million oil and gas wells in North America alone. Airborne surveys show such production operations can be a substantial source of $CH_4$ emissions. Typically, a large proportion of the total emissions are due to just a few sources. Effective action to locate these emissions is impeded by the technical difficulty of remotely detecting, locating, and quantifying individual source emission rates. To be broadly applicable, such monitoring would need to be automated. Numerous advanced technologies have been developed and deployed to detect leaks; however, without localization and emission rate quantification, remediation efforts cannot be focused on the relatively few substantial emitters that are found to be responsible for most of the gas emitted. Reliable emission rate quantification remains a major challenge, even for manned operations. Until source emission rates are readily measurable, it will remain impossible to demonstrate effective progress towards reducing greenhouse gas emissions.

From an oil and gas industry facilities and operations perspective, locating and fixing leaks will reduce product losses, improve safety, and minimize penalties due to statutory non-compliance. As stated earlier, from an environmental perspective, methane ($CH_4$), the primary component of natural gas, is a potent greenhouse gas with a 1100-year global warming potential 28 times that of $CO_2$.

Non-dispersive infrared (NDIR) sensors are typically used as gas detectors and operate by monitoring the absorption of infrared radiation through a target gas and determining what fraction of the incident radiation is absorbed, based on the Beer-Lambert Law, at a particular energy. The fraction of radiation absorbed depends on the pathlength occupied by the target gas, the wavelength of radiation being measured, and the molecule itself. The absorption arises from transitions in the vibrational-rotational energy levels of the target molecules. Such absorption only occurs if there is a change in dipole moment during these energy level transitions (that is, why diatomic symmetric molecules display no absorption in the gaseous state).

A methane ($CH_4$) molecule has five atoms and therefore it has nine fundamental modes of vibration to describe its vibrational motion, known as normal modes of vibration. Four of these normal modes are stretching and five are bending modes. Based on the irreducible presentations of the $T_d$ point group, these fundamentals modes of methane vibration can be assigned to four symmetry species A, E, $F_1$ and $F_2$, where one single vibration (symmetric stretch—$v_1$ at 3.43 µm) is the representation of the $A_1$ species due to four C—H bonds stretching, one doubly-degenerate vibration (symmetric bending—$v_2$ at 6.55 µm) belongs to the E class and two triply-degenerate vibrations (asymmetric C—H stretching mode—$v_3$ at 3.31 µm and asymmetric bending mode—$v_4$ at 7.66 µm) are representations of the $F_2$ species. The vibrational modes are defined either as infrared (IR) active or not, depending on the ability of producing IR spectra due to the change in the electric dipole moment. The IR active vibrational modes of the methane molecule are asymmetric modes $v_3$ and $v_4$, which are triply degenerate. The two other low intensity bands, $v_1$ and $v_2$ bands, are not IR active. Therefore, the IR spectrum of $CH_4$ gas contains a strong absorption band in the C—H stretching region, at 3.31 µm. Similarly, ethane ($C_2H_6$) and propane ($C_3H_8$) have C—H stretch molecular vibrations at 3.34 µm and 3.37 µm spectral wavelengths respectively. $H_2O$ molecules also have vibration-rotational spectra and absorb radiation in the infrared region. The $H_2O$ molecule in the gas phase has three fundamental molecular vibrations in the mid-infrared. The O—H stretching vibrations give rise to two absorption bands, i.e., an asymmetric stretch band at 2.662 µm and a symmetric stretch band at 2.734 µm.

Commercially available current laser-based sensing (e.g., laser dispersion spectroscopy) instrumentation is bulky, costly and usually designed as extractive point sensors, typically with multi-pass cell or high-finesse cavity for sensitivity enhancement through an increase in the optical pathlength. With this approach, accurate quantification of methane emissions from vast and distributed sources (e.g., wetlands, lakes, rivers, man-made water reservoirs) or point sources (e.g., leaks from gas pipeline infrastructure or shale (natural) gas drilling sites) is difficult, and precise localization requires deployment of a cost-prohibitive dense network of sensors. To date, this has only been possible using advanced open path gas sensors with optical beams steered across the area of interest. A steering optical beam requires mechanical moving parts that need to operate in extreme environmental conditions and will need to be serviced on a regular basis. Since many hundreds of sensors are required for any particular drilling site, this becomes impractical and cost prohibitive.

Accordingly, a need in the art exists for a compact and cost effective methane alert station for detecting a methane leak and a methane leak detection system for monitoring an environment having potential source(s) of methane leak.

BRIEF SUMMARY OF THE INVENTION

According to a first aspect of the invention, there is provided a methane alert station for detecting methane gas in an environment. The methane alert station comprises a casing having a central axis, at least one window opening formed in the casing, at least one infrared transmitting window disposed in the at least one window opening in the casing, at least one pulsed infrared light source disposed adjacent to the at least one infrared transmitting window within the casing, a hyperbolic mirror disposed in the casing coaxially with the central axis, a Winston cone disposed coaxially with the central axis and spaced from the hyperbolic mirror along the central axis such that the image plane of the hyperbolic mirror is at the input of the Winston cone, and a filter-detector arranged coaxially with the central axis, so that the Winston cone is disposed between the hyperbolic mirror and the filter-detector. The at least one pulsed infrared light source is configured to emit outgoing infrared light from the casing through the at least one infrared transmitting window. The filter-detector is configured to measure methane gas concentration in the environment by measuring absorption of infrared radiation of the methane gas at specific wavelength bandwidths.

According to a second aspect of the present invention, there is provided a methane leak detection system for monitoring methane leaks in an environment. The methane leak detection system includes a plurality of methane alert stations placed in the environment, which includes a plurality of potential sources of methane leaks, so that each of the methane alert stations corresponds to one of the potential sources of methane leakage, and a plurality of retroreflectors are located in the environment so that each of the potential sources of methane leakage is disposed between a corresponding methane alert station and at least one of the retroreflectors. Each of the methane alert stations comprises a casing having a central axis, a plurality of window openings formed in the casing around the central axis, a plurality of infrared transmitting windows each disposed in one of the window openings on the casing, a plurality of pulsed infrared light sources each disposed adjacent to one of the infrared transmitting windows within the casing, each of the pulsed infrared light sources configured to emit outgoing infrared light from the casing through one of the infrared transmitting windows toward one of the retroreflectors, a hyperbolic mirror disposed in the casing coaxially with the central axis, a Winston cone disposed coaxially with the central axis and spaced from the hyperbolic mirror along the central axis, and a filter-detector arranged coaxially with the central axis, so that the Winston cone is disposed between the hyperbolic mirror and the filter-detector so that the hyperbolic mirror and the Winston cone direct incoming IR light beams reflected from one of the retroreflectors onto the filter-detector. The filter-detector is configured to measure methane gas concentration in an environment by measuring absorption of infrared radiation of the methane gas at specific wavelength bandwidths.

According to a third aspect of the present invention, there is provided a method for monitoring an environment for methane leaks. The method includes the steps of dividing the environment into a plurality of imaginary grid sites each including a potential source of methane leakage, placing at least one retroreflector in each of the grid sites, and placing a methane alert station in each of the grid sites so that each of the potential sources of methane leakage is disposed between a corresponding methane alert station and at least one of the retroreflectors. Each of the methane alert stations comprises a casing having a central axis, a plurality of window openings formed in the casing around the central axis, a plurality of infrared transmitting windows each disposed in one of the window openings in the casing, a plurality of pulsed infrared light sources each disposed adjacent to one of the infrared transmitting windows within the casing, a hyperbolic mirror disposed in the casing coaxially with the central axis, a Winston cone disposed coaxially with the central axis and spaced from the hyperbolic mirror along the central axis, and a filter-detector arranged coaxially with the central axis, so that the Winston cone is disposed between the hyperbolic mirror and the filter-detector so that the hyperbolic mirror and the Winston cone direct incoming IR light beams reflected from one of the retroreflectors onto the filter-detector. Each of the pulsed infrared light sources is configured to emit an outgoing infrared light from the casing through one of the infrared transmitting windows toward one of the retroreflectors. The filter-detector is configured to measure methane gas concentration in an environment by measuring absorption of infrared radiation of the methane gas at specific wavelength bandwidths.

Other aspects of the invention, including apparatus, devices, systems, methods, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
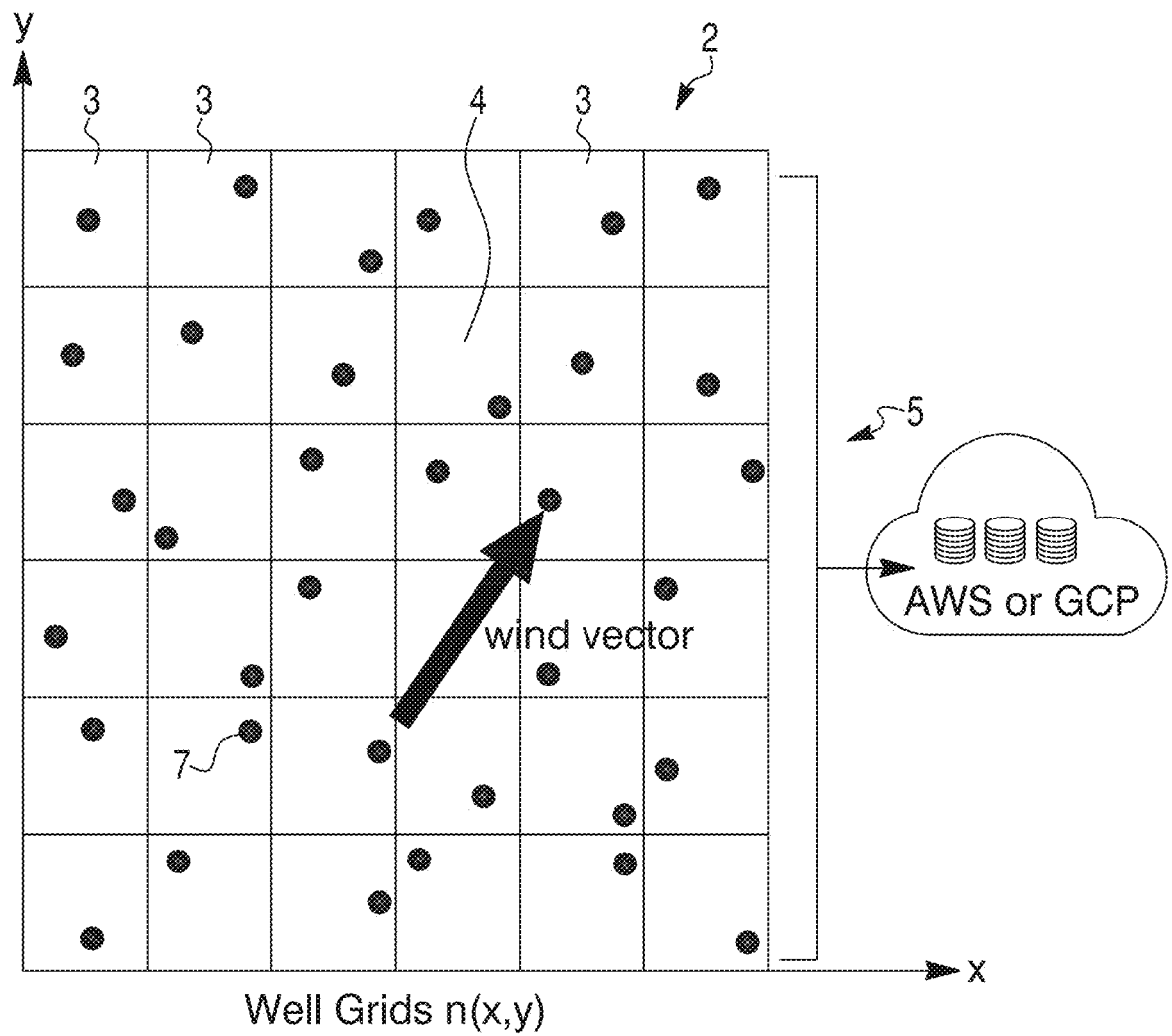
FIG. 1 is a schematic view of a gas field including a plurality of grid sites each including a gas/oil well.

DETAILED DESCRIPTION OF EXEMPLARY EMBODIMENT(S) AND EMBODIED MFTHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "front," "rear," "upper", "lower", "right", "left", "top" and "bottom" as well as derivatives thereof (e.g., "horizontally," "vertically," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

An exemplary embodiment of a methane leak detection system is generally represented in FIG. 1 by reference numeral 5. The methane leak monitoring system 5 is configured for detecting (or monitoring) an environment having potential source(s) of methane leakage, such as, but not limited to, a gas or oil field 2, for methane leaks. The methane leak monitoring system 5 may also be used for monitoring methane leaks on vast and distributed sources (e.g., wetlands, lakes, rivers, man-made water reservoirs) or point sources (e.g., leaks from gas pipeline infrastructure or shale (natural) gas drilling sites). As illustrated in FIG. 1, a surface 3 of the gas/oil field 2 is divided into a plurality of imaginary square grid sites 4, each grid site 4 including one gas/oil well 7. Each of the gas/oil wells 7 is a potential methane gas source, and thus potentially a source of a methane ($CH_4$) leak (i.e., potential source of methane leak). Moreover, each of the grid sites 4 includes a methane alert station (or apparatus) 10 according to the exemplary embodiment of the present invention and at least one retroreflector $6_1$ disposed at a predetermined distance from the methane alert station 10. According to the exemplary embodiment of the present invention, each of the grid sites 4 includes first, second and third retroreflectors 61, and 63, respectively, In the interest of simplicity, the following discussion will sometimes use reference numeral 6 without a subscript numeral to designate an entire group of retroreflectors. For example, the reference numeral 6 will be sometimes used when generically referring to the retroreflectors $6_1$, $6_2$ and $6_3$. The retroreflectors 6 according to the exemplary embodiment are made of a metallized plastic sheet, such as 3M™ High Intensity Prismatic Reflective Sheeting Series 3930. An area of each of the retroreflectors 6 is large, e.g., 1 m², so that alignment is not a significant problem. Each of the retroreflectors $6_1$, $6_2$ and $6_3$ is disposed at a predetermined distance (approximately 25 m) from the methane alert station 10. Thus, the methane leak monitoring system 5 comprises a plurality of the methane alert stations 10, and a plurality of retroreflectors 6 placed in the gas/oil field 2 so that each of the gas/oil wells 7 is disposed between the corresponding one of methane alert stations 10 and at least one, and preferably three retroreflectors 6.

The methane alert station 10 is configured to remotely measure and quantify methane emission rates produced in industrial activities, such as at the gas/oil field 2, so that effective remedial action can be taken. The methane alert station 10 can be used in a sensor network to continuously detect, locate, and quantify methane emission sources distributed across extensive areas. The methane alert station 10 is configured to measure path-averaged $CH_4$ gas concentrations. Measurements from the methane alert station 10 combined with wind velocity data, and statistical methods can be used to locate and quantify mass emission rates of the potential sources 7 of methane.

The methane alert station 10 uses a non-dispersive infrared (NDIR) detection type sensing device to measure and quantify methane (GIL) gas concentration in the environment and, when used in combination with a wind velocity measurement system and remote sensing algorithms, can locate methane leak sources in oil and gas drilling sites/fields. NDIR sensors operate by monitoring the absorption of infrared radiation through a target gas and determining what fraction of the incident radiation is absorbed, based on the Beer-Lambert law, at a particular energy. The fraction of radiation absorbed depends on the pathlength occupied by the target gas, the wavelength of radiation being measured, and the molecule itself. The absorption arises from transitions in the vibrational-rotational energy levels of the target molecules. Such absorption only occurs if there is a change in dipole moment during these energy level transitions (that is, why diatomic symmetric molecules display no absorption in the gaseous state).

Figure 3:
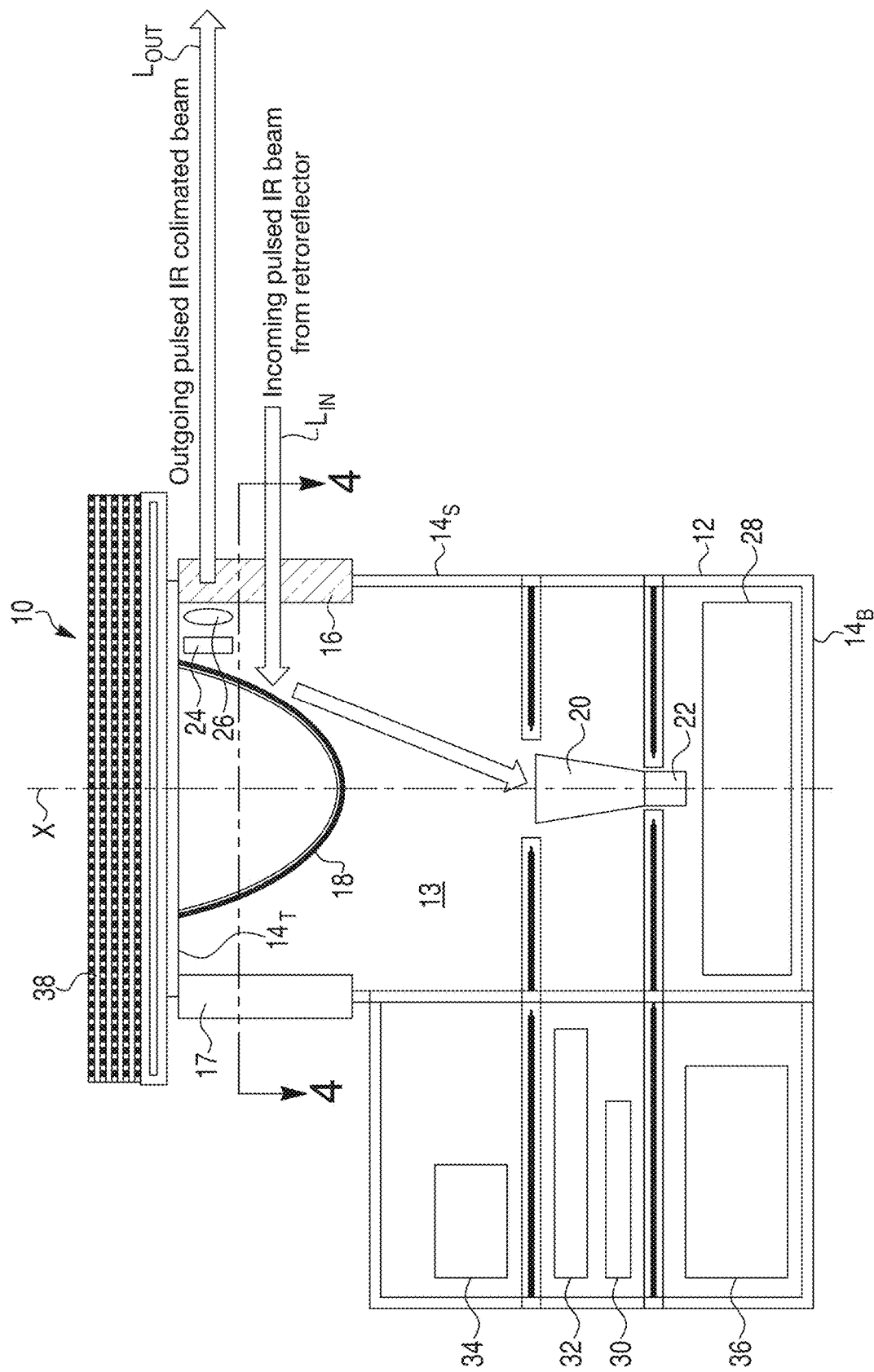
FIG. 3 is a schematic cross-sectional view of the methane alert station in accordance with the exemplary embodiment of the present invention.
Figure 4:
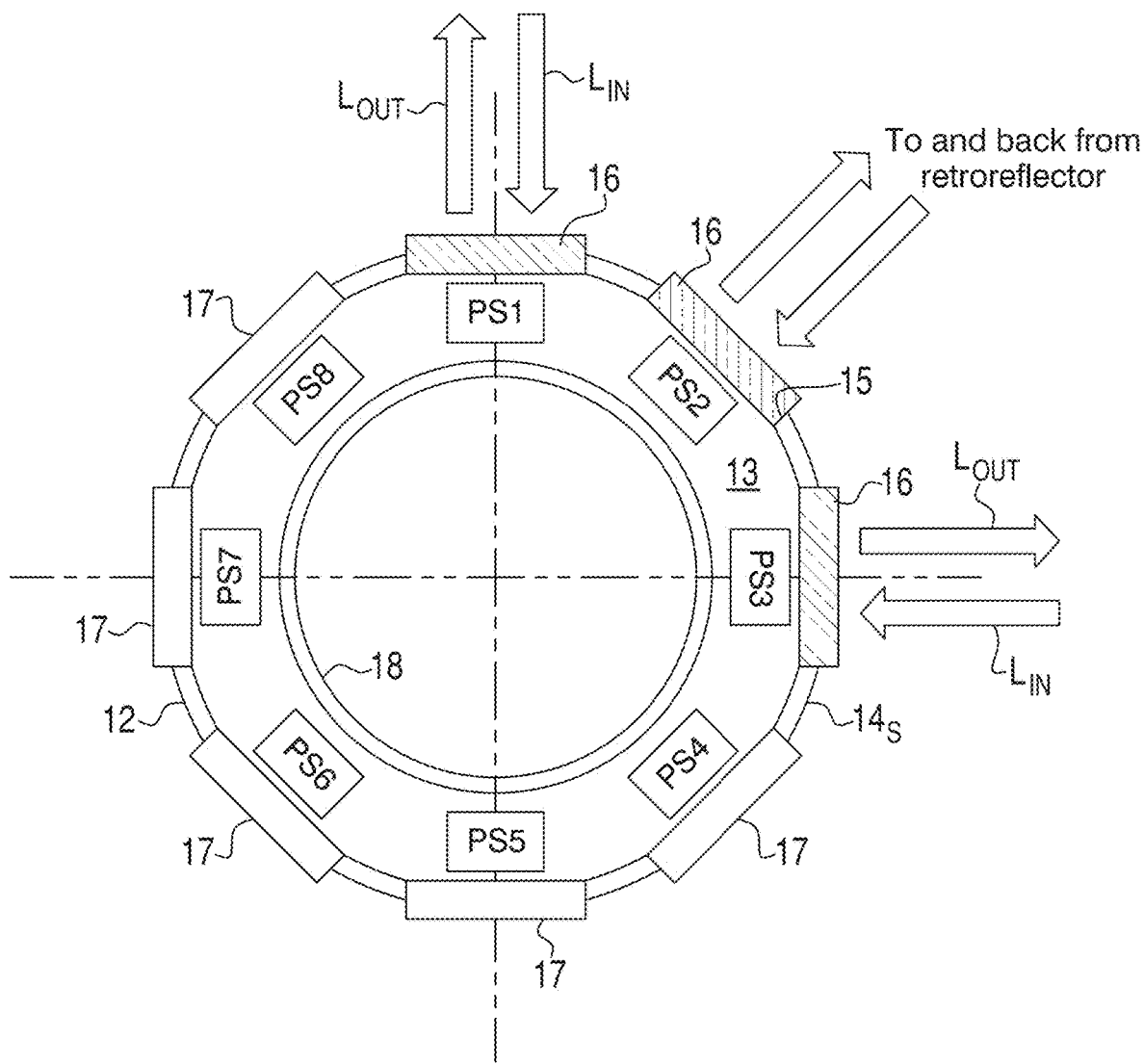
FIG. 4 is a schematic cross-sectional view of the methane alert station taken along the line 4-4 in FIG. 3.

The methane alert station 10, as best shown in FIGS. 3-4, comprises a casing 12 having a central axis of symmetry X, a plurality of window openings 15 formed in the casing 12 around the central axis X, a plurality of transparent solid material defining IR (infrared) transmitting windows 16 transmitting IR light, a hyperbolic mirror 18 disposed between the window openings 15 coaxially with the central axis X, a Winston cone 20 coaxial with the central axis X and spaced from the hyperbolic mirror 18 along the central axis X, and a filter-detector, such as a quad filter-detector 22, adjacent to the Winston cone 20 and coaxial with the central axis X. Alternatively, the methane alert station 10 may comprise one window opening 15 formed in the casing 12, and one IR (infrared) transmitting window 16 transmitting IR light.

The Winston cone 20 is disposed between the hyperbolic mirror 18 and the quad filter-detector 22. The hyperbolic mirror 18 and the Winston cone 20 are configured to collect returned light from the retroreflectors 6, disposed at known distances from the methane alert station 10, and impinge the returned light onto the quad filter-detector 22. Each of the IR transmitting windows 16 is disposed in one of the window openings 15. Preferably, the methane alert station 10 comprises eight (8) window openings 15, but only three (3) of the IR transmitting windows 16 are disposed in three of the window openings 15. The rest of the window openings 15 are covered with metal blanks 17, as best shown in FIG. 4. It should be understood that, alternatively, more or fewer than three IR transmitting windows 16 may be used in the methane alert station 10. Each of the IR transmitting windows 16 is made of an IR light transmitting solid material, such as silicon or sapphire. The hyperbolic mirror 18 can be segmented into three parts to reduce cost as the hyperbolic mirror segments may be mass produced using carbon-fiber resin molds and metallized.

It is expected that any natural gas leak will have species of ethane ($C_2H_6$) and propane ($C_3H_8$) mixed with the major $CH_4$ component species. The present invention accesses the 3 μm spectral region of the mid-IR, where the $CH_4$ (3.31 μm), $C_2H_6$ (3.34 μm) and $C_3H_8$ (3.38 μm) absorptions are strongest and allows for the monitoring of methane gas, as well as the ambient background concentration from all three gases combined (typical ambient levels are 2 ppm, 1.5 ppb, and 0.7 ppb for $CH_4$, $C_2H_6$, $C_3H_8$, respectively). The simulated infrared absorption profiles of $CH_4$, $C_2H_6$ and $C_3H_8$ show minimal crosstalk of ~10% between $CH_4$ and ($C_2H_6$+$C_3H_8$) combined. In this embodiment of the invention a bandpass spectral filter at a center wavelength of 3.31 μm is specified for $CH_4$ and a bandpass filter is specified at a center wavelength 3.35 μm for ($C_2H_6$+$C_3H_8$) combined. Any water vapor, $H_2O$, spectral interferences are modelled using a 2.7 μm center wavelength bandpass spectral filter. To calibrate the data, a 3.8 μm center wavelength bandpass spectral reference filter may be used.

Figure 5:
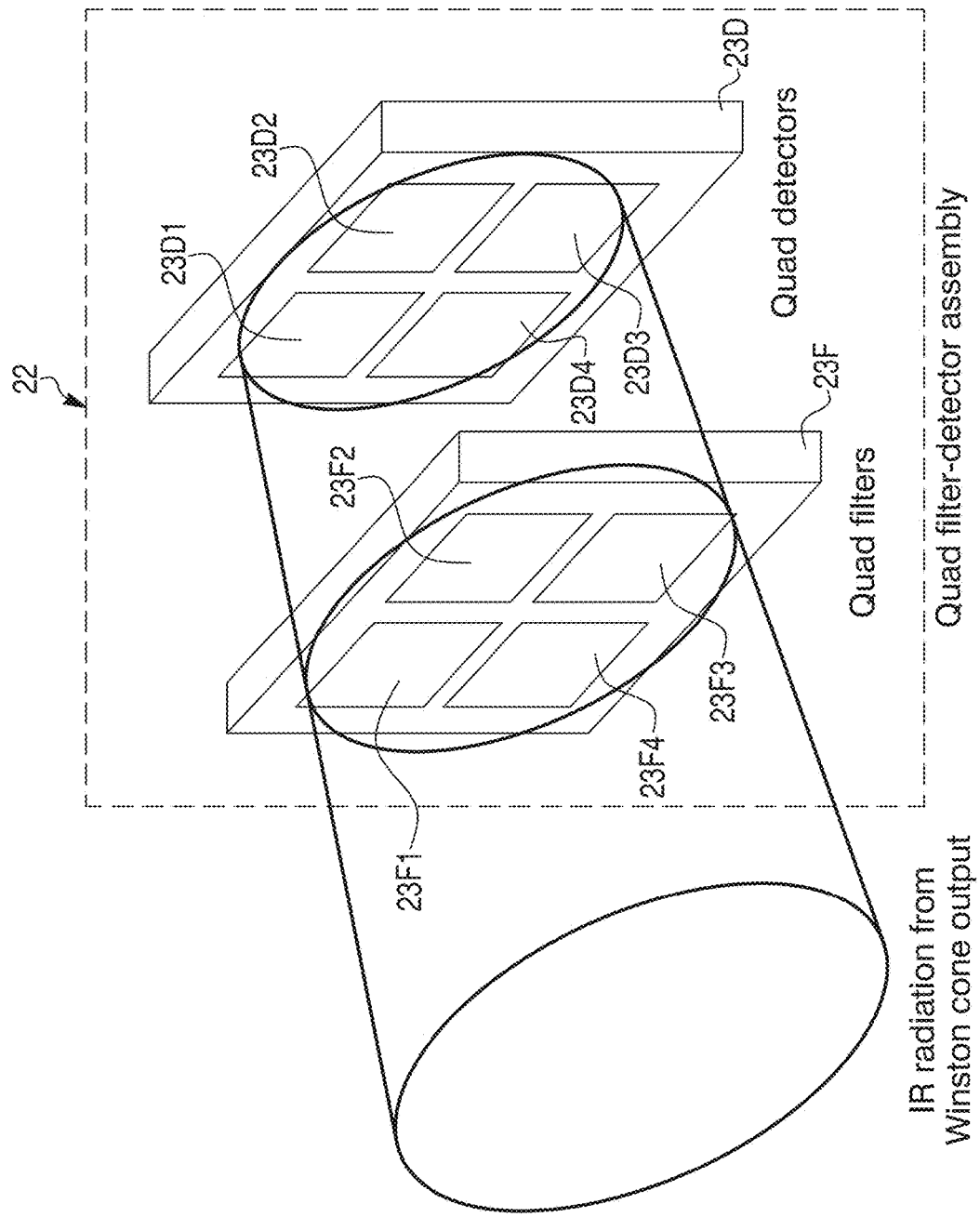
FIG. 5 shows irradiance of an incoming pulsed IR light beam returned from a retroreflector through a Winston cone on a quad filter-detector.

The quad filter-detector 22 is a quad thermopile sensor integrated with four narrow band bandpass optical infrared filters, which measure an absorption of infrared (IR) radiation of target gases at specific wavelength bandwidths. It is known in the art that thermopile sensors are intended to measure temperature from a distance by detecting an object's infrared (IR) energy. The higher the temperature, the more energy is emitted, A thermopile sensing element of a thermopile sensor, composed of small thermocouples on a silicon chip, absorbs thermal energy and produces an electrical output signal. In FIG. 5, the quad filter-detector 22 is shown schematically comprising a filter section 23F including four filters 23F1-23F4 placed in front of a sensor section 23D including four detectors 23D1-23D4. Each filter-detector combination within the quad filter-detector 22 represents a filter spectral channel with a defined spectral bandwidth. The four bandpass filter channels of the quad filter-detector 22 in the exemplary embodiment are: channel #1: 3.31±0.03 μm with >70% peak transmission for $CH_4$ detection; channel #2: 3.34±0.12 μm with >70% peak transmission for ($CH_4$+$C_2H_6$+$C_3H_8$) detection; channel #3: 2.7±0.1 μm with >75% transmission for water vapor detection, and channel #4: 3.8±0.1 μm with >75% peak transmission for reference signal detection.

Thus, according to the exemplary embodiment, a bandpass spectral filter at a center wavelength of 3.31 μm is specified for $CH_4$ and a bandpass filter is specified at a center wavelength 3.35 μm for ($C_2H_6$+$C_3H_8$) combined. Any water vapor, $H_2O$, spectral interferences are modelled using a 2.7 μm center wavelength bandpass spectral filter. To calibrate the data a 3.8 μm center wavelength bandpass spectral reference filter may be used. In order to accommodate the spectral ranges discussed above, the methane alert station 10 according to the exemplary embodiment uses a broad band IR source that covers the emittance spectral range between 2.5 and 4 μm.

Figure 7:
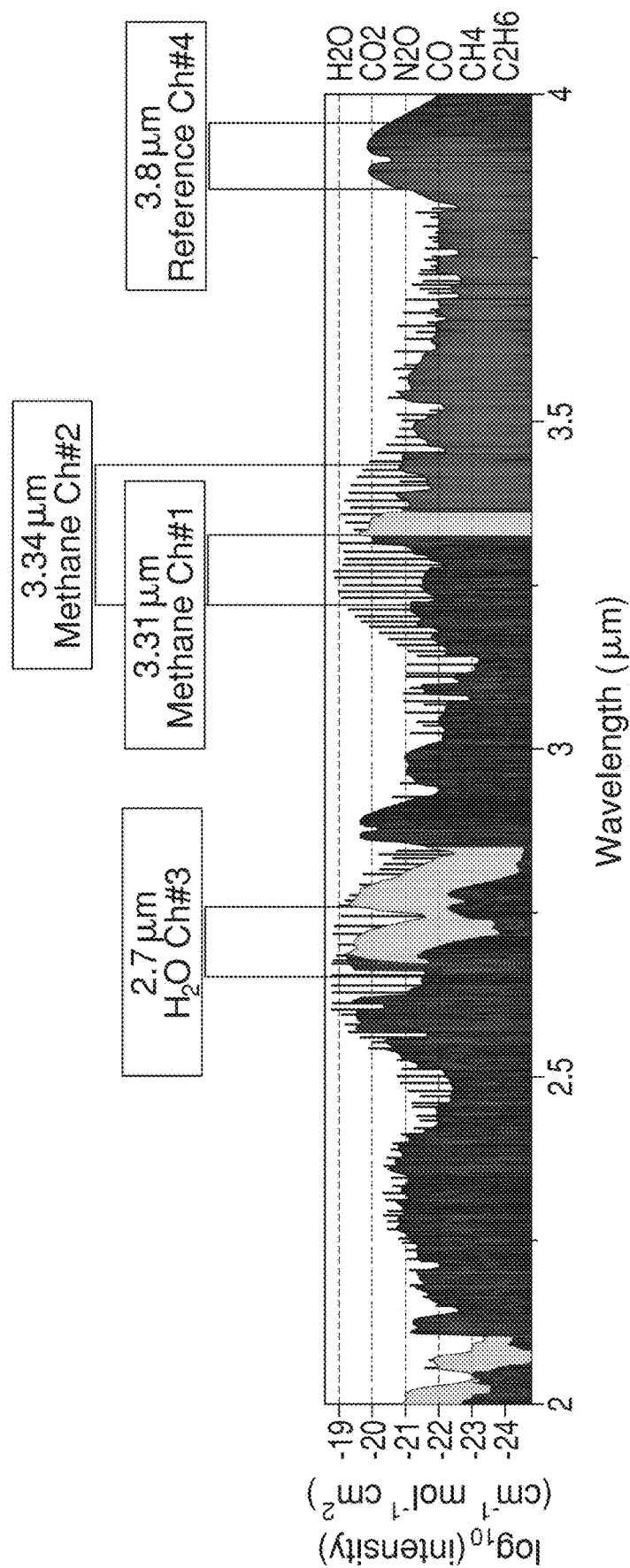
FIG. 7 shows a HITRAN 2016 simulation of common atmospheric gases mixed with methane and ethane at 1012 mb and 288 K and the location of the two methane filter channels.

FIG. 7 shows a HITRAN 2016 U.S. standard atmosphere model simulation at 1012 mb and 288 K between 2 and 4 μm infrared spectral range. Superimposed on this Figure is the location of filter channels #1, #2, #3 and #4 of the methane alert station 10.

Figure 8:
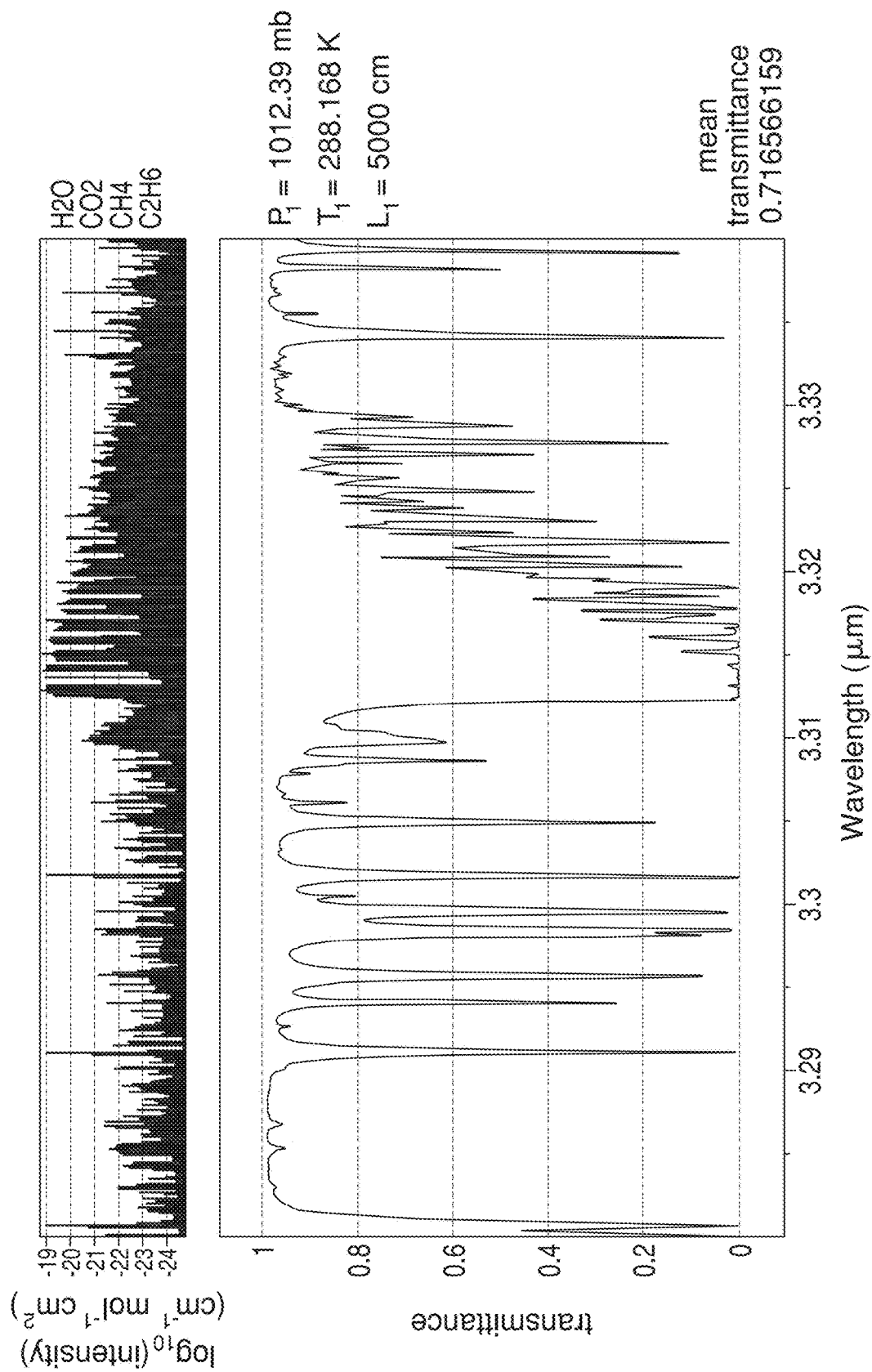
FIG. 8 shows HITRAN 2016 U.S. standard atmospheric; model transmission simulations of channel #1 at 3.31 µm center wavelength with half width half maximum (HWHM) bandwidth of 0.06 µm for methane and ethane abundance ×50 above the natural background level.
Figure 9:
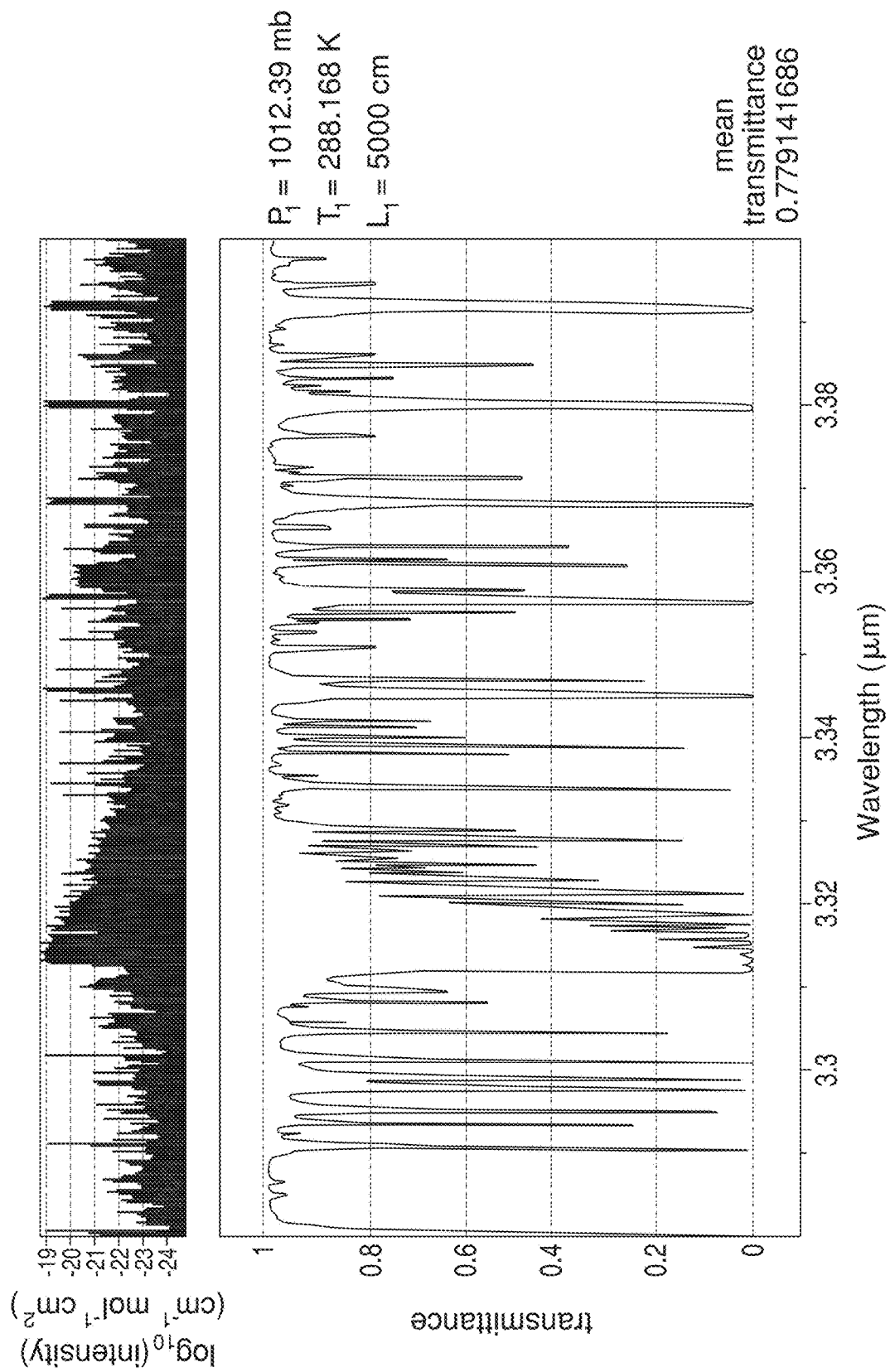
FIG. 9 shows HITRAN 2016 U.S. standard atmospheric model transmission simulations of channel #2 at 3.34 µm center wavelength with HWHM bandwidth of 0.12 µm for metham and ethane abundance ×50 above the natural background level.

FIGS. 8 and 9 show transmission plots for channel #1 (at 3.31 μm center wavelength with a half width half maximum (HWHM) bandwidth of 0.06 μm) and channel #2 (at 3.34 liin center wavelength with a HWHM bandwidth of 0.12 μm) filter bandwidths, for a standard atmosphere but with the methane ($CH_4$) and ethane ($C_2H_6$) concentrations ×50 greater than the background, which represents a concentration of ~100 ppm for methane and 75 ppb for ethane. This results in channel #1 and channel #2 reduction of transmittance by 19% and 15% respectively, for a 50 m optical path length.

FIG. 5 also shows how the light radiation output from the Winston cone 20 impinges on the quad filters 23F1-23F4 and consequently the quad detectors 23D1-23D4. The separation of the quad filters 23F1-23F4 and quad detectors 23D1-23D4 is based on the system's requirements, and may be ~1 mm. The quad filter-detector 22 enables three gas mixture detection and quantification. Alternatively, the thermopile detector can be replaced by high detectivity photodiodes that are responsive in the appropriate passband spectral ranges.

The casing 12 of the methane alert station 10, as best shown in FIG. 3, includes a top wall 14T, a bottom wall 14B, and a continuous side wall 14S interconnecting the top wall 14T with the bottom wall 14B so as to define an inner cavity 13 within the casing 12. As best shown in FIGS. 3 and 4, the window openings 15 are formed in the side wall 14S of the casing 12. Also, the hyperbolic mirror 18, the Winston cone 20 and the quad filter-detector 22 are all disposed within the inner cavity 13. According to the exemplary embodiment, the volume of the inner cavity 13 within the casing 12 is less than 40 cm$^3$.

Figure 6:
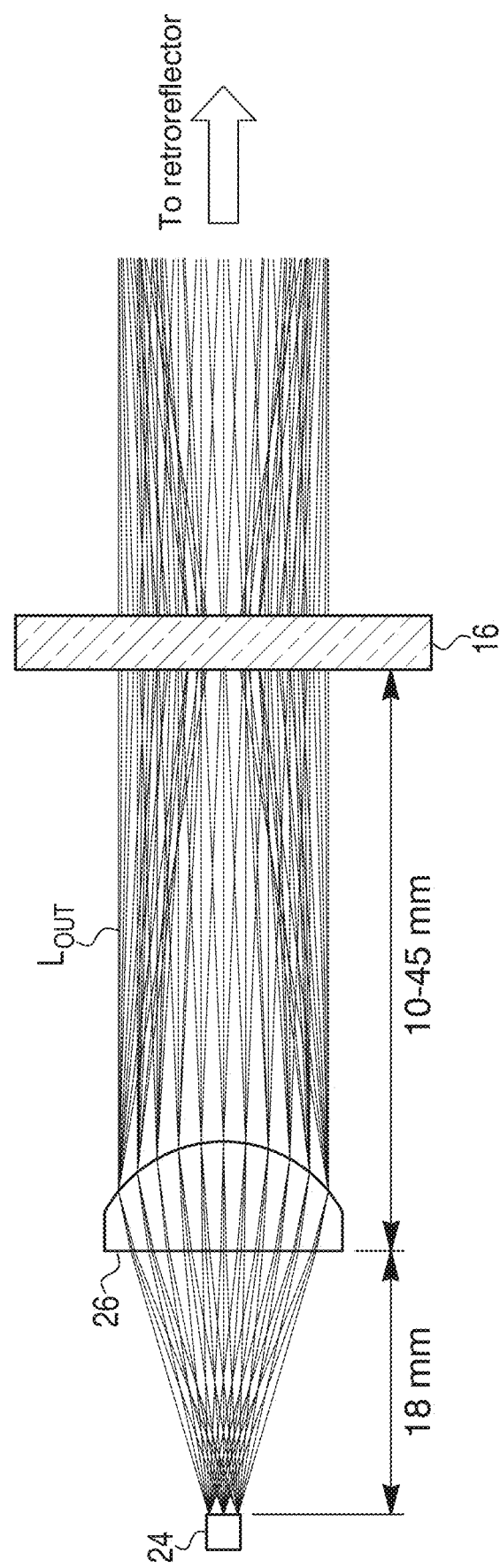
FIG. 6 shows an outgoing pulsed IR light beam emitted from a pulsed IR light source, collimated by an IR collimating lens, and exiting the methane alert station through an IR transmitting window, according to the exemplary embodiment of the present invention.

The methane alert station 10 further comprises a number of pairs of pulsed IR (infrared) light source 24 and an IR collimating lens 26, both disposed adjacent (i.e., in close proximity) to one of the IR transmitting windows 16 within the casing 12. According to the exemplary embodiment, the pulsed IR light sources 24 are each a MEMS based infrared emitter known in the art, and the IR collimating lens 26 is a plano-convex lens, as best shown in FIG. 6. The pulsed IR light sources 24 may generate IR light pulse at different frequencies that are collimated using the IR collimating lens 26. The IR collimating lens 26 may be made of CaF$_2$ material, other IR materials, e.g., silicon. Alternatively, the methane alert station 10 may comprise one pair of pulsed IR (infrared) light source 24 and IR collimating lens 26.

Figure 10:
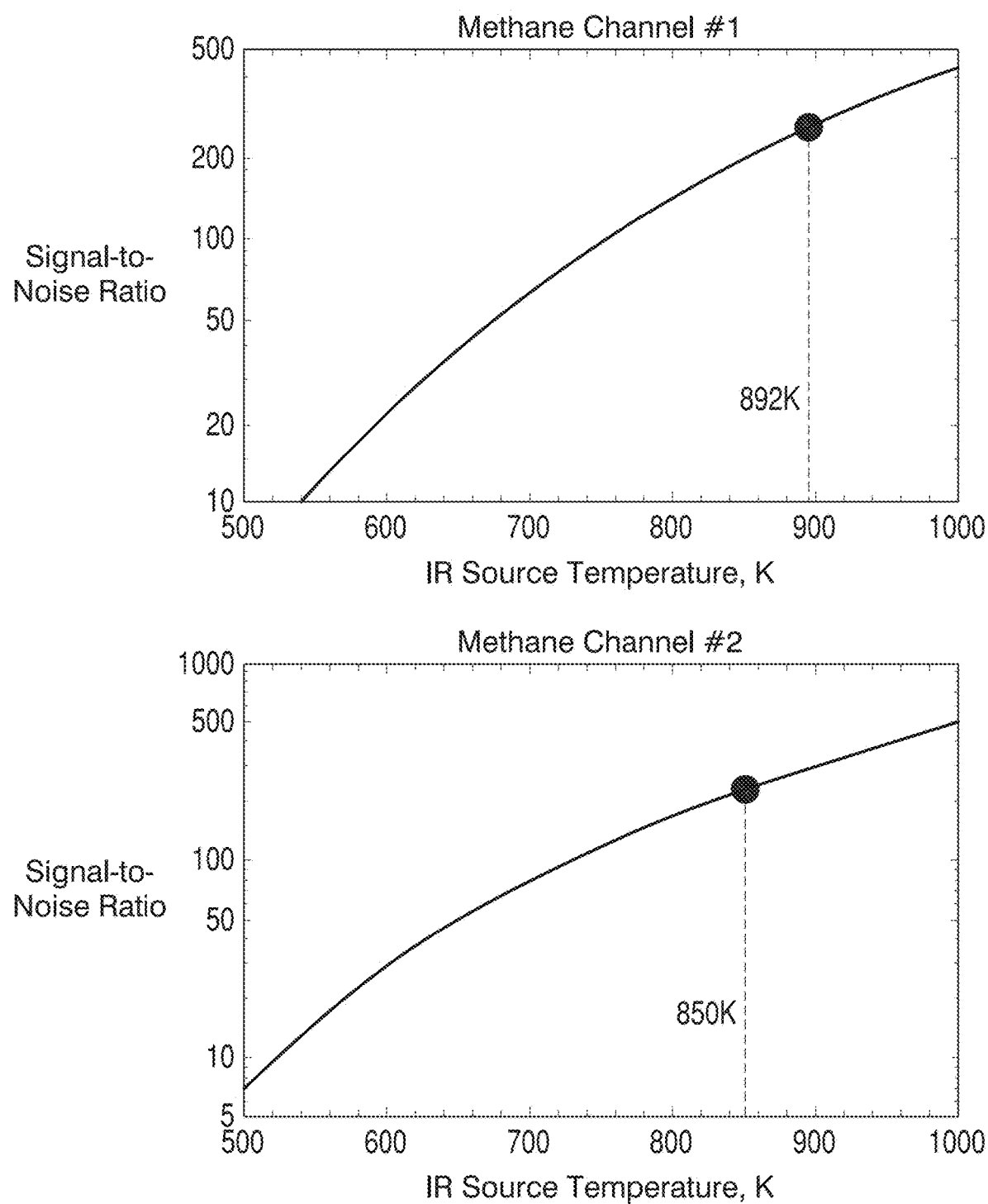
FIG. 10 shows the Signal-to-Noise Ratios (SNRs) for detection of ~100 ppm methane as a function of IR source temperature for the methane alert station channels #1 and #2.

FIG. 10 shows plots of SNR (signal-to-noise ratio) as a function of temperature of a pulsed IR light source. A 900 mW IR source will achieve a SNR of ~100 and a 1200 mW IR source will achieve a SNR of ~200. SNR calculations are based on ~100 ppm methane (including background) at a height of 5 m, the absorption path length is 50 m, emissivity of the source is 0.5, the optical efficiency of system is conservatively 0.3, the étendue (AΩ) $2\times10^{-6}$ m$^2$sr, the thermopile detectivity is $3.6\times10^8$ cm√Hz/W and integration time of 1 s.

Figure 2:
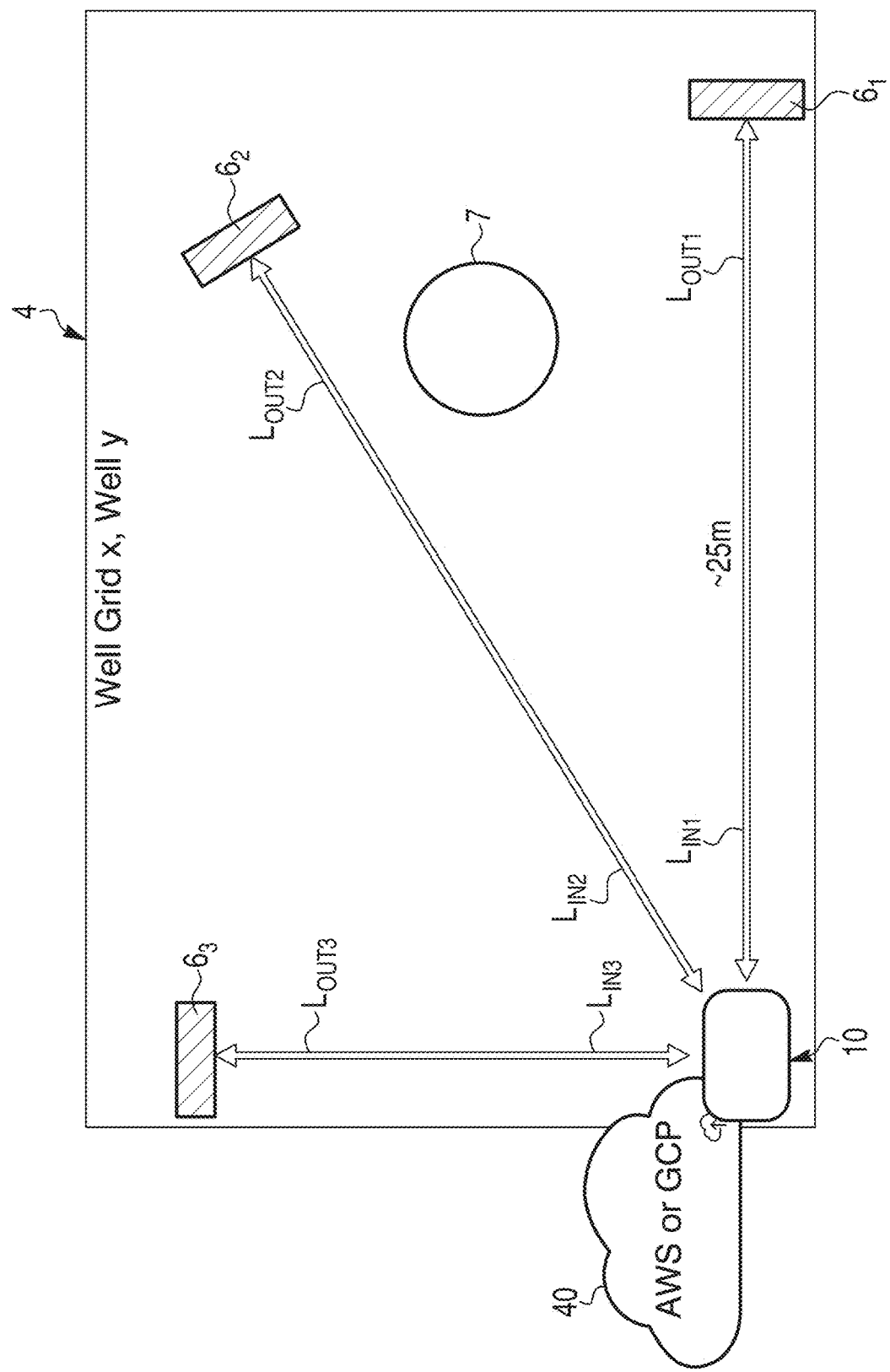
FIG. 2 is a schematic view of one of the grid sites of FIG. 1 including a methane alert station in accordance with an exemplary embodiment of the present invention.

According to the exemplary embodiment, the methane alert station 10 comprises three pairs of the pulsed IR light sources 24 and IR collimating; lens 26 behind each of the IR transmitting windows 16 so that the IR collimating lens 26 are placed between the pulsed IR light sources 24 and the IR transmitting windows 16, as best shown in FIGS. 3, 4 and 6. Each pair of the pulsed IR light sources 24 and the IR collimating lens 26 together define a pulsed IR beam source PS1, PS2 or PS3, each emitting an outgoing IR light beam LOUT through one of the IR transmitting windows 16 toward one of the retroreflectors 6, as best shown in FIGS. 2, 3, 4 and 6. Thus, the methane alert station 10 comprises first, second and third pulsed IR beam sources PS1, PS2 and PS3, respectively. Specifically, as illustrated in FIG. 2, the first IR beam source PSI emits a first outgoing IR light beam $L_{OUT1}$ toward the first retroreflector $6_1$, the second IR beam source PS2 emits a second outgoing IR light beam $L_{OUT2}$ toward the second retroreflector $6_2$, and the third IR beam source PS3 emits a third outgoing IR light beam $L_{OUT3}$ toward the third retroreflector $6_3$. The reference characters PS will be sometimes used when generically referring to the pulsed IR beam sources PS1, PS2 or P53. Alternatively, the methane alert station 10 may comprises more or fewer than three pulsed IR beam sources PS.

Each pulsed IR light source 24 is a broadband IR source that can be pulsed and has good emissivity over the 2-to-4 μm spectral range. As best shown in FIG. 6, the IR light from the pulsed IR light source 24 is collimated through the IR collimating plano-convex lens 26 and the IR transmitting window 16. The three pulsed IR light sources 24 operate sequentially, and each of the pulsed IR light sources 24 is paired with a common quad filter-detector 22.

Figure 11:
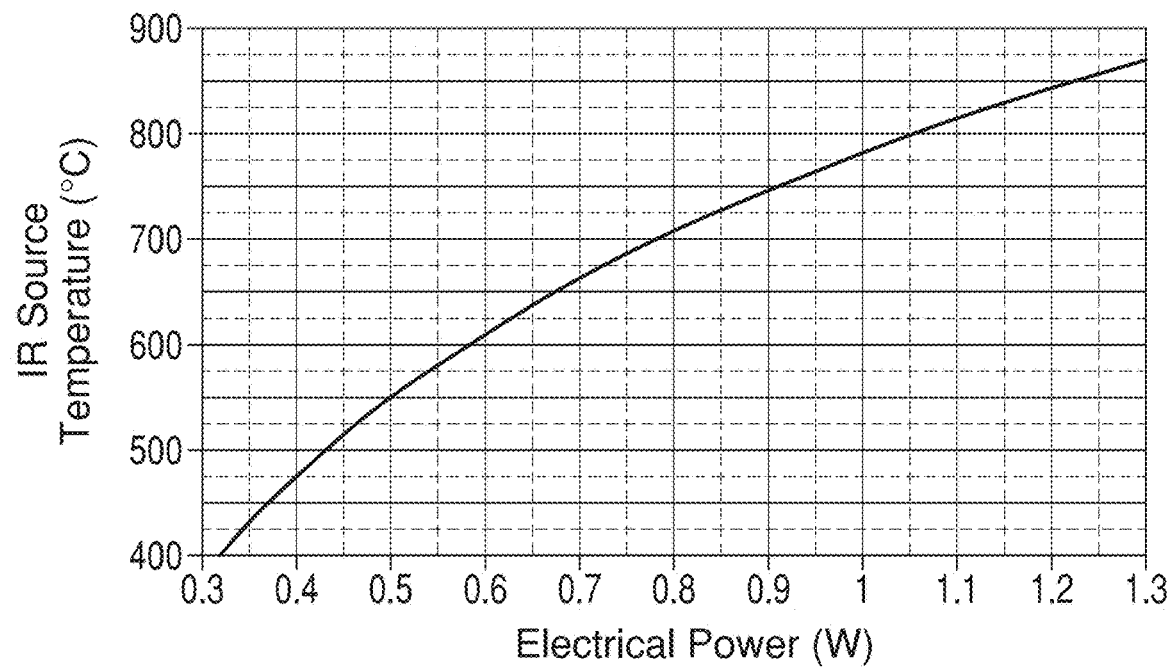
FIG. 11 is a graph illustrating the relationship of the temperature of a pulsed IR light source as a function of input electrical power.
Figure 12:
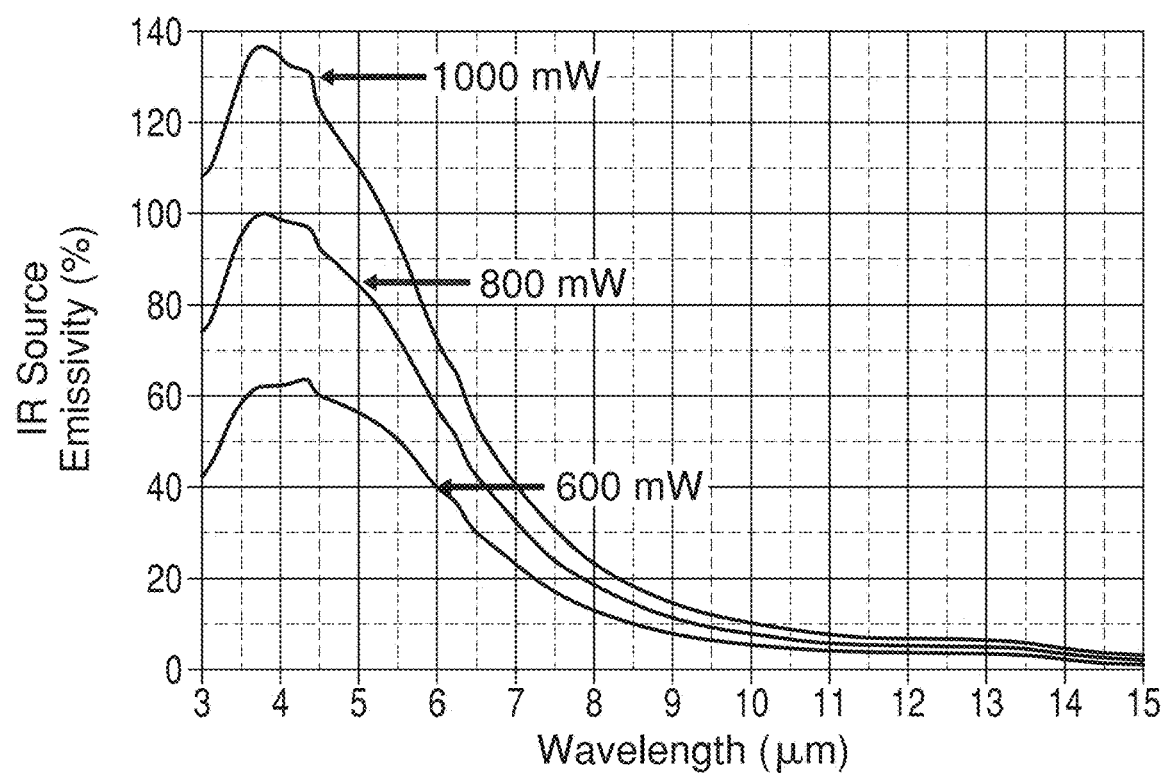
FIG. 12 is a graph illustrating the relationship of the emissivity of the pulsed IR light source as a function of wavelength.

The radiant emittance, M, (i.e., the radiant flux emitted by a surface per unit area) of the pulsed IR light source 24 for a source of area, $A_s$, at a distance, d, is related to the temperature, T, and emissivity, $\epsilon$, by $M=\epsilon\sigma T^4 A_s/\pi d^2$, where σ is the Stefan-Boltzmann constant. FIG. 11 shows a graph illustrating how the temperature, of the IR light source 24 can be changed by changing the input electrical power of the IR light source 24. FIG. 12 is a graph illustrating the relationship of the emissivity, $\epsilon$, as a function of wavelength for three input electrical power settings of the IR light source 24.

In the exemplary embodiment of the present invention, each of the retroreflectors $6_1$, $6_2$ and $6_3$ is placed at ~25 in from the pulsed IR beam source PS. Each of the outgoing IR light beams $L_{OUT}$ is reflected from one of the retroreflectors 6 toward the methane alert station 10 as an incoming IR light beam $L_{IN}$. Each of the incoming IR, light beams $L_{IN}$ enters the methane alert station 10 through a corresponding one of the IR transmitting windows 16, is collected by the hyperbolic mirror 18 and the Winston cone 20, and directed onto the quad filter-detector 22. Thus, the pulsed IR light beams generated by the IR beam sources PS travel a double path length of ~50 m. Alternatively, the methane alert station 10 may comprise eight pulsed sources PS1-PS8 disposed behind each of the window openings 15, as best shown in FIG. 4, however, only three of the pulsed IR beam sources (PS1, PS2 and PS3), which are disposed behind the IR transmitting windows 16, are used. According to the exemplary embodiment, at least some of the metal blanks 17 can be replaced with IR transmitting windows 16, thus permitting more pulsed sources to be used. This configuration allows various arrangements of the placement of the methane alert station 10 and the retroreflectors 6 in an oil and gas field setting.

As noted above, the infrared filter passbands that reside within the $CH_4$, ($CH_4+C_2H_6+C_3H_8$) and $H_2O$ absorption bands may serve as gas detection channels, and the infrared filter that resides outside of the target gas absorption bands may serve as a reference channel. Thus, the optical bandpass filters of the quad filter-detector 22 are centered at wavelengths 3.31 μm (channel #1) and 3.34 μm (channel #2) for $CH_4$ detection, 2.7 μm (channel #3) for $H_2O$ detection and 3.8 μm (channel #4) for detection of a reference signal. Simplistically, the ratio of the gas detection channel voltage signal to the reference channel voltage signal allows for the concentration of the target gas (i.e., methane) to be determined. Specifically, when the pulsed IR light beam generated by the IR beam source PS interacts with methane gas molecules (if they are present in the environment), the infrared light is absorbed by the methane gas molecules at a particular wavelength, causing vibration of the methane gas molecules. In other words, the methane gas causes absorption of specific wavelengths of light.

In operation, when the incoming IR light beam $L_{IN}$ enters the methane alert station 10 and reaches the quad detectors 23D1-23D4 of the quad filter-detector 22 through the quad filters 23F1-23F4 the quad detectors 23D1-23D4 detect a decrease in transmitted IR light if the incoming IR light beam $L_{IN}$ interacts with the methane gas before entering the methane alert station 10. A detected decrease in the transmitted IR light is proportional to the methane gas concentration. Specifically, the quad filters 23F1-23F4 of the quad filter-detector 22 eliminate all light except the wavelength that the methane gas molecules can absorb. The quad detectors 23D1-23D4 behind the quad filters 23F1-23F4 detect attenuation in transmitted IR light beam of these wavelengths, which is proportional to the methane gas concentration. The attenuation of these wavelengths is measured by the quad detectors 23D1-23D4 of the quad filter-detector 22 to determine the methane gas concentration. Thus, the methane alert station 10 measures and quantifies the methane ($CH_4$) gas concentration in the in the gas/oil field 2.

Figure 13:
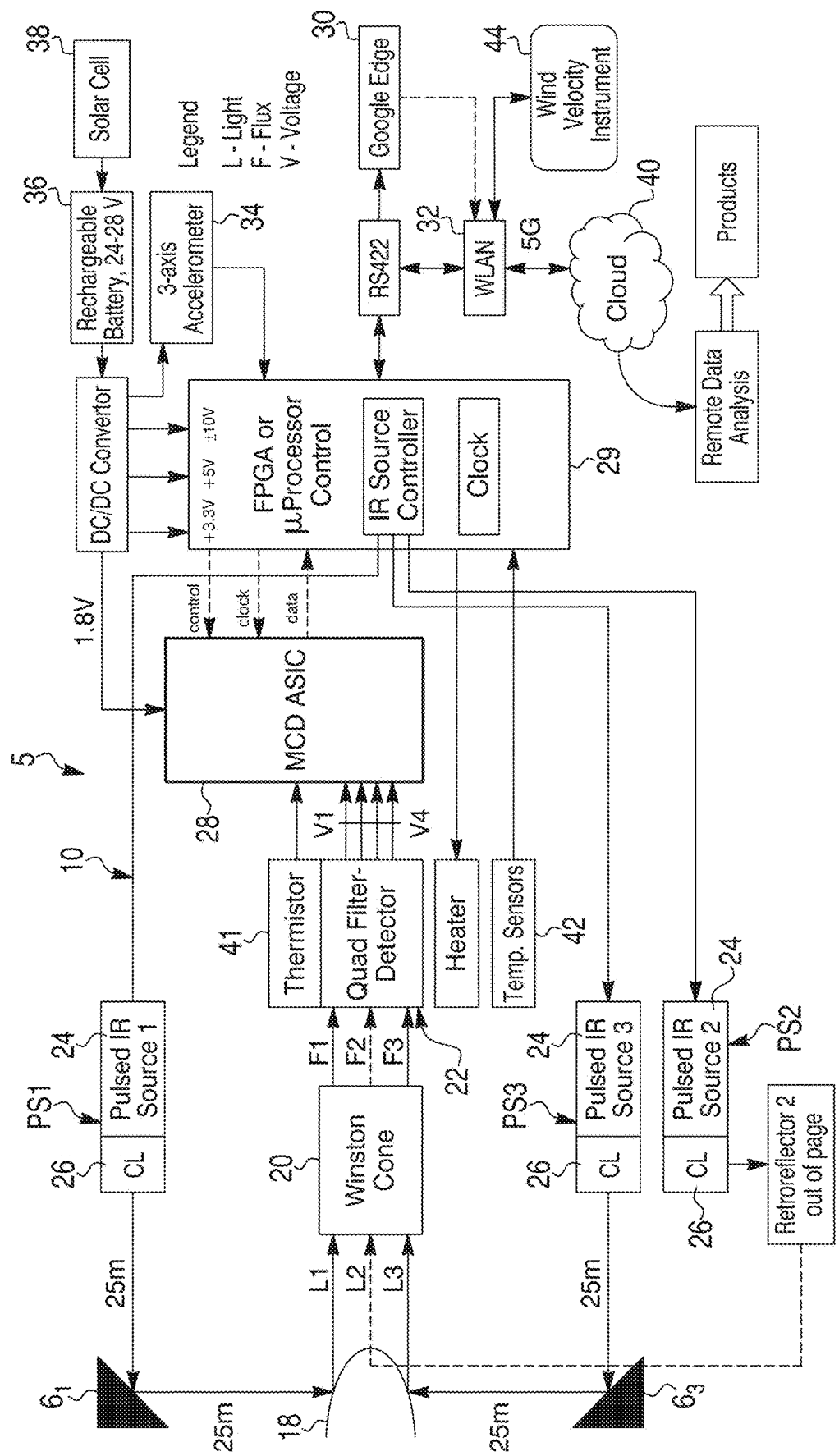
FIG. 13 is a block diagram of a methane leak detection system including the methane alert station illustrating functional elements of the methane alert station according to the exemplary embodiment of the present invention.

The methane alert station 10 further comprises a low noise parallel readout circuit (or controller) 28 operatively connected to the quad filter-detector 22 for low noise front end readout of the quad filter-detector 22, an AI (Artificial Intelligence) chip 30, and a WLAN (Wireless Local Area Network) 32 providing wireless communication capability, all disposed within the inner cavity 13 of the casing 12, as best shown in FIG. 3. As best shown in FIG. 13, the readout circuit 28 includes an MCD (Multi-Channel Digitizer) ASIC (Application-Specific integrated Circuit) electrically connected to the quad filter-detector 22, and configured to amplify, sample, and digitize thermoelectric voltages generated by the absorbed IR light on the quad filter-detector 22. Specifically, the MCD ASIC 28 separately or concurrently amplifies, by way of chopper stabilized amplifiers, the microvolt signals, followed by digitizing each of the amplified signals. For example, the amplified signal may be digitized from 12 bits to 24 bits. The MCD ASIC 28 is controlled by a Field Programmable Gate Array (FPGA) 29 through SPI protocol. The ASIC EA modulator with a digital Sine filter removes high frequency noise and decimates the single bit stream to a high-resolution data word. The combination of chopping, analog integration, ADC oversampling ratio (OSR) and the filter determines the output bandwidth and the frequency response, resulting in a dramatic reduction in the 1/f noise of the amplified signal According to the exemplary embodiment, implementing a $3^{rd}$ order Sine filter on the FPGA 29, with a modulation frequency of, $f_{mod}$=250 kHz, and OSR=1024, a decimation of a single bit stream into 24-bit data words is obtained.

The digitized signals from the ASIC are communicated to the FPGA (or microprocessor) 29 for further data processing, as best shown in FIG. 13. The MCD ASIC 28 is configured to receive data from the quad filter-detector 22 and the FPGA 29. The MCD ASIC 28 has up to twenty readout channels, with 2 to 1 interlacing to double the number of inputs, each of which includes low-offset variable gain amplifiers driving a dedicated low-noise second-order sigma-delta A/D converter to digitize microvolt signals. The number of utilized channels of the MCD ASIC 28 depends on the system requirements. The channels of the MCD ASIC 28 interface directly to thermopile outputs and amplify/digitize the signals with variable gain/resolution. Up to 24-bit digitization of the signals can be effectively attained by using the analog front-end gain and oversampling ratio. The MCD ASIC 28 allows for all 4-channels of the quad filter-detector 22 to be read out in parallel. The MCD ASIC 28 also can capture all house-keeping output (HKO) data. The MCD ASIC 28 reads small (>100 nV) voltage signals. Alternatively, the MCD ASIC 28 may be an analog-to-digital converter (ADC) that receives microvolt signals (e.g., 100 nV) by way of its channels. The MCD ASIC 28 continues with sampling (or averaging) the digitized signals. However, depending on the embodiment, MCD ASIC may perform the sampling prior to digitizing the amplified signal.

Thus, readout of the thermopile voltages from the quad filter-detector 22 may be performed by the MCD ASIC 28.

According to the exemplary embodiment, MCD ASIC 28 is a radiation hardened CMOS chip manufactured in a 180 nm CMOS process. The MCD ASIC 28 for the methane alert station 10 has the capability of using up to 20 independent amplifier channels with variable gain, automatic offset reduction, integration, and digitization. Each channel is connected to its own ADC (Analog-to-Digital Converter) with a resolution determined by the user. Each channel has the ability to operate in a 2:1 interleaved mode, thus doubling the number of inputs that can be digitized up to a total of forty.

Figure 14:
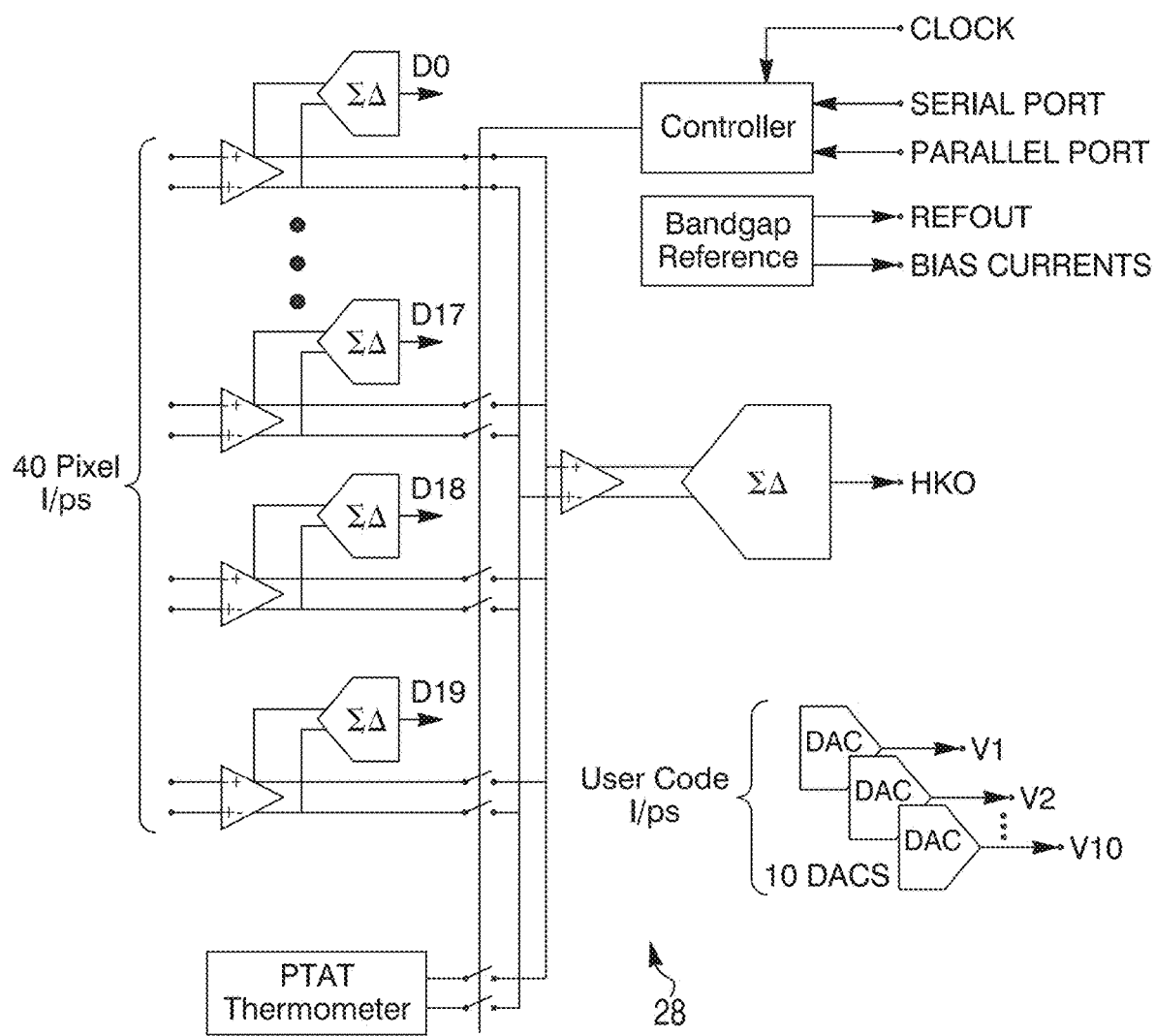
FIG. 14 shows a system block diagram of a MCD ASIC.

The ASIC in the exemplary embodiment is controlled, via a serial port interface (SPI), while data from the ADCs streams continuously back to MEB via CMOS or low voltage differential signal (LVDS) paths. The ASIC also contains ten DACs so as to generate all required reference voltages both for itself and the quad filter-detector 22. An on-chip digital thermometer allows the ASIC to provide junction temperature measurements for gain calibration. A thermistor 41 in the quad filter-detector 22, and a diode-based temperature sensor 42 near the quad filter-detector 22 as best shown in FIG. 13, can also be digitized for calibration of the signals from the quad filter-detector 22. As shown in FIG. 14 illustrating a system block diagram of the MCD ASIC 28, a channel ADC is configured to average integrator outputs for increased thermal noise filtering. Multiple channels can be digitized in parallel.

The AI chip 30 may be the Google Edge AI chip designed for Google's TensorFlow framework, a symbolic math library which is used for machine learning applications such as neural networks. The AI chip 30 is used to infer important methane absorption spectra and only transfer this to Cloud 40, such as Amazon Web Services (AWS) or Google Cloud Products (GCP), for data storage, reducing overall data volume. Telemetry to the Cloud 40 may be provided through WLAN 32. A 3-axis accelerometer 34 can be added to the methane alert station 10 in order to deduce "motion sickness" of derived methane absorption. A wind velocity instrument 44 is time stamped precisely with the methane alert station 10 so that remote data analysis can be performed with integrity.

The methane alert station 10 further comprises an electric battery 36 and a solar panel (or photo-voltaic module) 38 mounted to the top wall 14T of the casing 12. According to the exemplary embodiment, the battery 36 is a rechargeable battery and the solar panel 38 is provided for recharging the battery 36. The electric battery 36 is operatively connected to each of the pulsed IR light sources 24 and the quad filter-detector 22.

According to an exemplary embodiment of the present invention, the calibration procedure of the methane alert station 10 relies on Schwarzchild's equation for radiative transfer. The Schwarzschild's equation for the transmission of radiation through an absorbing and/or emitting medium in local thermodynamic equilibrium [Kirchhoff's law: photons are absorbed and re-emitted as the local temperature T, and source function $S_{80}=B_\lambda(T)$] is given by:

$$DI_\lambda = n\sigma_\lambda[B_\lambda(T)-I_\lambda]ds = \alpha_\lambda[B_\lambda(T)-I_\lambda]ds, \qquad \text{Equation (1)}$$

where n is the molecular density (number per unit volume), $\sigma_\lambda$ is the absorption cross section at wavelength $\lambda[cm^2]$, $\alpha_\lambda$ is the absorption coefficient at wavelength $\lambda[cm^{-1}]$, $B_\lambda(T)$ is the Planck function for temperature T and wavelength $\lambda$, $I_\lambda$ is the spectral density of the radiation at the wavelength $\lambda$ entering the medium and $DI_\lambda$ is the incremental change in spectral density through the medium after the distance ds.

The transfer equation can also be expressed using the variable $\tau_\lambda$, called the optical depth, defined by:

$$d\tau_\lambda = \alpha_\lambda ds \quad \text{Equation (2)}$$

or $$\tau_\lambda(s_1, s_2) = \int_{s_1}^{s_2} \alpha_\lambda ds \quad \text{Equation (3)}$$

The solution of the transfer equation can now be expressed as:

$$\frac{dI_\lambda}{d\tau_\lambda} - I_\lambda = -B_\lambda(T) \quad \text{Equation (4)}$$

$$\frac{d}{d\tau_\lambda}(I_\lambda e^{-\tau_\lambda}) = -B_\lambda(T)e^{-\tau_\lambda} \quad \text{Equation (5)}$$

integrating $$[I_\lambda(0)e^{-\tau_\lambda}]_{\tau_1}^{\tau_2} = -\int_{\tau_1}^{\tau_2} e^{-x} B_\lambda(x) dx \quad \text{Equation (6)}$$

$$I_\lambda(\tau_1) = I_\lambda(0)e^{-(\tau_2 - \tau_1)} + \int_{\tau_1}^{\tau_2} e^{-(x - \tau_\lambda)} B_\lambda(x) dx \quad \text{Equation (7)}$$

The first term shows that the intensity originating at $\tau_2$ decreases by an exponential factor to $\tau_1$. The second term shows that the contribution to the intensity by the internal emission along the path from $\tau_2$ to $\tau_1$ also decreases by an exponential factor.

Now assuming that the source contribution is independent of the location, $\tau_1 = 0$, $\tau_2 = \tau_\lambda$ we obtain:

$$I_{so}(\tau_1) = I_\lambda(0)e^{-\tau_\lambda} + B_\lambda(T)\int_{\tau_1}^{\tau_2} e^{-x} dx \quad \text{Equation (8)}$$

$$I_{so}(\tau_1) = I_\lambda(0)e^{-\tau_\lambda} + B_\lambda(T)(1 - e^{-\tau_\lambda}) \quad \text{Equation (9)}$$

The first term corresponds to the Beer-Lambert law. The second term can be omitted for applications that are spectrally away from the background thermal infrared.

In the present invention, the source is nominally delivering 800 mW of power during a pulse of 1 second, i.e., 0.8 J per cycle.

Assuming that the temperature of the gas is T≈290 K, the change of thermal emission relative to the source emission is given by:

$$\Delta B_{\lambda 1}^{\lambda 2} = \int \frac{B_\lambda(T + \Delta T) - B_\lambda(T)}{I_\lambda} d\lambda \quad \text{Equation (10)}$$

The radiative transfer equations can be implemented by defining the following parameters:

- $I_\lambda(0)$ correspond to the flux provided by the infrared source, collimated and entering the gas cell. The source is either ON or OFF, leading to the upper script [on, off, p2p—for peak-to-peak=on-off];
- $\tau_\lambda$ is the optical depth, and $e^{-\tau_\lambda}$ is the transmittance. The HITRAN 2016 spectroscopic database can be used to calculate these values for various pressures and temperatures;
- $B_\lambda(T)$ is blackbody emission of the environment at a temperature T;
- $I_\lambda(\tau_1)$ correspond to the flux reaching the top of each thermopile. Later on, we will use lowerscript REF and GAS to identify the flux corresponding to the reference channel #4 or the gas detection channels #1 or #2.

The integrated flux, through each bandpass filter, with a filter transmission bandwidth between wavelengths $\lambda_1$ and $\lambda_2$ defined at half width half maximum, reaching each thermopile with an effective spectral $[R_\lambda]$—which includes the transmission of the IR lens and IR window, reflection losses at the retroreflector, transmission of each bandpass spectral filter at the channel center wavelengths and the thermal sensitivity of the thermopile—is converted into a voltage [V].

$$V = \int_{\lambda_1}^{\lambda_2} I_\lambda R_\lambda d\lambda \quad \text{Equation (11)}$$

This analog voltage signal is in turn biased, amplified, sampled and digitized by the MCD ASIC, to give a digital number (DN).

$$DN \equiv V + V_{bias} \quad \text{Equation (12)}$$

or $$DN \equiv \int_{\lambda_1}^{\lambda_2} R_\lambda [I_\lambda(0)e^{-\tau_\lambda} + B_\lambda(T)(1 - e^{-\tau_\lambda})] d\lambda + V_{bias} \quad \text{Equation (13)}$$

By using alternating measurements with the source turned on and off, we obtain peak to peak measurement:

$$DN^{p2p} = DN^{ON} - DN^{OFF} \quad \text{Equation (14)}$$

$$DN^{p2p} \equiv \int_{\lambda_1}^{\lambda_2} R_\lambda [I_\lambda(0)e^{-\tau_\lambda} + B_\lambda(T + \Delta T)(1 - e^{-\tau_\lambda})] d\lambda + \quad \text{Equation (15)}$$

$$V_{bias}^{ON} - \int_{\lambda_1}^{\lambda_2} R_\lambda [B_\lambda(T)(1 - e^{-\tau_\lambda})] d\lambda - V_{bias}^{OFF}$$

Regarding background thermal emission, and assuming that the bias voltage is stable over the cycle, the above expression from Equation (15) reduces to:

$$DN^{p2p} \equiv \int_{\lambda_1}^{\lambda_2} R_\lambda [I_\lambda(0)e^{-\tau_\lambda}] d\lambda \quad \text{Equation (16)}$$

The average incident flux is defined as:

$$I^{p2p} = \frac{\int_{\lambda_1}^{\lambda_2} R_\lambda I_\lambda d\lambda}{\int_{\lambda_1}^{\lambda_2} R_\lambda d\lambda} \quad \text{Equation (17)}$$

So, for a narrow bandpass filter:

$$DN^{p2p} \equiv I^{p2p} \int_{\lambda_1}^{\lambda_2} R_\lambda e^{-\tau_\lambda} d\lambda \quad \text{Equation (18)}$$

Therefore, the following pair measurement is obtained:

$$DN_{REF}^{p2p} \equiv \tilde{I}_{REF}^{p2p} \qquad \text{Equation (19)}$$

$$DN_{GAS}^{p2p} \equiv T_{GAS}^{p2p} \int_{\lambda_1}^{\lambda_2} R_\lambda e^{-\tau_\lambda} d\lambda = T_{GAS} Tr_{GAS}(P_{GAS}, T), \qquad \text{Equation (20)}$$

where $Tr_{GAS}(P_{GAS})$ is the total transmittance for a given channel, which function of the partial pressure $P_{GAS}$ and temperature T.

Based on the above:

The linear relationship between the two channels can be established so that the reference channel can be used to estimate what the incident flux for the gas channel would be;

The total transmittance over each spectral channel for various temperature can be calculated so that a monotonically varying look-up table for $Tr_{GAS}(P_{GAS}, T)$ can be defined. The same table can then be used to do an inverse search $[P_{GAS}(Tr_{GAS}, T)]$.

The procedure to derive the vapor partial pressure, hence gas concentration, is as follows:

1. Use $DN_{REF}^{p2p}$ to obtain an estimate of the $\tilde{DN}_{GAS,0}^{p2p} = \alpha DN_{REF}^{p2p} + \beta$;

2. Calculate the transmitted ratio:

$$Tr_{GAS} = \frac{DN_{GAS}^{p2p}}{\tilde{DN}_{GAS,0}^{p2p}};$$

3. Do the inverse search $P_{GAS}(Tr_{GAS}, T)$.

A method for monitoring the gas or oil field 2 for methane leaks comprises the following steps. First, an area of an environment, such as the gas/oil field 2, is hypothetically divided into a plurality of imaginary square grid sites 4, each including one of the gas/oil wells 7. One of the methane alert stations 10 is placed in each of the grid sites 4, thus creating a sensor network defining the methane leak monitoring system 5 configured to continuously detect, locate, and quantify methane emission sources (i.e., the methane leaks) distributed across extensive areas of the gas/oil field 2. Then, three or more retroreflectors 6 are placed in each of the grid sites 4 so that the gas/oil well 7 of each of the grid sites 4 is disposed between the methane alert station 10 and one of the retroreflectors 6.

Next, the methane alert stations 10 in the grid sites 4 are actuated so that the pulsed IR beam sources PS of each of the methane alert stations 10 emit outgoing IR light beams $L_{OUT}$ sequentially toward the retroreflectors 6. Each of the pulsed IR beam sources PS emits an outgoing IR light beam $L_{OUT}$ toward a corresponding one of the retroreflectors 6. Specifically, as illustrated in FIG. 2, the first IR beam source PS1 emits a first outgoing IR light beam $L_{OUT1}$ toward the first retroreflector $6_1$, the second IR beam source PS2 emits a second outgoing IR light beam $L_{OUT2}$ toward the second retroreflector $6_2$, and the third IR beam source PS3 emits a third outgoing IR light beam $L_{OUT3}$ toward the third retroreflector $6_3$. Subsequently, the incoming IR light beams $L_{IN1}$-$L_{IN3}$ reflect from the corresponding retroreflectors $6_1$-$6_3$, and sequentially enter the methane alert station 10 through one of the IR transmitting windows 16. When the incoming IR light beams $L_{IN}$ interact with methane gas molecules en route to the methane alert station 10 (if they are present in any of the grid sites 4 of the gas/oil field 2), the infrared light is absorbed by the methane gas molecules at a particular wavelength of light, causing vibration of the methane gas molecules. Moreover, the incoming IR light beams $L_{IN1}$-$L_{IN3}$ entering the methane alert station 10 are collected by the Winston cone 20 and directed onto the quad filter-detector 22.

The incoming IR light beams LIN from the Winston cone 20 impinge on the quad detectors 23D1-23D4 through the quad filters 23F1-23F4. In turn, the quad detectors 23D1-23D4 detect a change (such as attenuation) in the incoming IR light beams LIN of the particular wavelength, which is proportional to the methane gas concentration. The attenuation of these wavelengths is measured by the quad detectors 23D1-23D4 of the quad filter-detector 22 to determine the methane gas concentration. Thus, the methane alert station 10 measures and quantifies the methane ($CH_4$) gas concentration in the gas/oil field 2. As a result, the methane gas (with strong absorption features within 2 to 7 μm spectral wavelength range (useful range of the broadband pulsed IR beam source PS)) that flows in an open path between the pulsed IR beam sources PS and the retroreflectors 6 will be detected by the methane alert station 10. If the concentration of the methane gas in the gas/oil field 2 is detected by at least one of the methane alert stations 10 to be greater than a predetermined threshold, then the methane leak is determined, and the methane leak monitoring system 5 sets an alarm to indicate the presence of excessive concentration of methane in the atmosphere.

The methane alert station 10 is provided to monitor and quantify over time $CH_4$ gas concentration and a combined ($CH_4+C_2H_6+C_3H_8$) concentration as a function of temperature, in an open path configuration, using three pulsed IR beam sources PS, operated sequentially, each paired with a quad filter-detector 22. According to an exemplary embodiment of the present invention, the methane alert station 10 is centered at 2.7 μm for $H_2O$ vapor detection, 3.31 μm for $CH_4$ gas detection, 3.34 μm for combined ($CH_4+C_2H_6+C_3H_8$) gas detection and 3.8 μm for a reference signal detection. Alternatively, a 4 μm channel can be used as a reference channel. Accordingly, the methane alert station 10 is configured to monitor and measure the $CH_4$ gas concentration as a function of time.

Therefore, the present invention provides a novel cost-effective methane gas leak detection system comprising methane alert stations that can be mass-produced cheaply, that has no moving parts, which is robust, with open-path methane sensors that can transmit data to the cloud for remote analysis. The methane alert station uses a non-dispersive infrared detection scheme to measure and quantify methane ($CH_4$) gas leakage and, when used in combination with a wind velocity measurement system and remote sensing algorithms, can locate methane leak sources in an environment having potential source(s) of methane leak. The methane leak detection system of the present invention can automatically identify $CH_4$ sources and report their emission rates in order to activate earlier and better remedial action.

Although the exemplary embodiment of the present invention is described for the oil and/or gas extraction industry, the present invention is not limited to the oil and gas industry sector, and has also many industrial applications for detection of gases, that have strong absorption bands in the 2-to-7 μm spectral wavelength bands, on Earth. Furthermore, in the future when human astronauts set foot on the Moon and to the red planet Mars, the methane alert station 10 may have many applications for in-situ resource management.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A methane alert station, comprising:
a casing having a central axis;
at least one window opening formed in the casing;
at least one infrared transmitting window disposed in the at least one window opening in the casing;
at least one pulsed infrared light source disposed adjacent to the at least one infrared transmitting window within the casing, the at least one pulsed infrared light source configured to emit outgoing infrared light from the casing through the at least one infrared transmitting window;
a hyperbolic mirror disposed in the casing coaxially with the central axis;
a Winston cone disposed coaxially with the central axis and spaced from the hyperbolic mirror along the central axis; and
a filter-detector arranged coaxially with the central axis so that the Winston cone is disposed between the hyperbolic mirror and the filter-detector, the filter-detector configured to measure methane gas concentration by measuring absorption of infrared radiation of methane gas at specific wavelength bandwidths.

2. The methane alert station as defined in claim 1, further comprising: at least one infrared collimating lens disposed within the casing between the at least one pulsed infrared light source and the at least one infrared (IR) transmitting window.

3. The methane alert station as defined in claim 2, wherein the filter-detector comprises a filter section including at least one handpass spectral filter, and a sensor section including at least one sensor configured to detect methane gas concentrations.

4. The methane alert station as defined in claim 2, wherein the filter-detector is a quad filter-detector comprising a filter section and a sensor section, wherein the filter section includes four handpass spectral filters, and wherein the sensor section includes four sensors configured to detect methane gas concentrations.

5. The methane alert station as defined in claim 1, further comprising:
a plurality of window openings formed in the casing around the central axis;
a plurality of infrared (IR) transmitting windows, each window disposed in one of the window openings in the casing;
a plurality of pulsed infrared light sources, each source disposed adjacent one of the infrared transmitting windows within the casing, wherein each of the pulsed infrared light sources is configured to emit an outgoing infrared light from the casing through one of the infrared transmitting windows.

6. The methane alert station as defined in claim 5, further comprising: a plurality of infrared collimating lenses, each lens disposed within the casing between one of the pulsed infrared light sources and one of the IR transmitting windows.

7. The methane alert station as defined in claim 5, wherein the IR transmitting windows are disposed in some but not all of the window openings.

8. The methane alert station as defined in claim 5, wherein the filter-detector comprises a filter section including at least one handpass spectral filter, and a sensor section including at least one sensor configured to detect a methane gas concentration.

9. The methane alert station as defined in claim 5, wherein the filter-detector is a quad filter-detector comprising a filter section and a sensor section, wherein the filter section includes four handpass spectral filters, and wherein the sensor section includes four sensors configured to detect a methane gas concentration.

10. The methane alert station as defined in claim 6, wherein the pulsed infrared light sources operate sequentially.

11. The methane alert station as defined in claim 8, further comprising: a low noise parallel readout circuit operatively connected to the quad filter-detector for low noise front end readout of the quad filter-detector.

12. A methane leak detection system for monitoring methane leaks in an environment, the methane leak detection system comprising:
a plurality of methane alert stations placed in an environment including a plurality of potential sources of methane leak so that each of the methane alert stations corresponds to one of the potential sources of methane leak; and
a plurality of retroreflectors placed in the environment so that each of the potential sources of methane leak is disposed between the corresponding methane alert station and at least one of the retroreflectors;
each of the methane alert stations comprising:
a casing having a central axis;
a plurality of window openings formed in the casing around the central axis;
a plurality of infrared (IR) transmitting windows each disposed in one of the window openings in the casing;
a plurality of pulsed infrared light sources each disposed adjacent to one of the infrared transmitting windows within the casing, each of the pulsed infrared light sources configured to emit an outgoing infrared light from the casing through one of the infrared transmitting windows toward one of the retroreflectors;
a hyperbolic mirror disposed in the casing coaxially with the central axis;
a Winston cone disposed coaxially with the central axis and spaced from the hyperbolic mirror along the central axis; and
a filter-detector arranged coaxially with the central axis so that the Winston cone is disposed between the hyperbolic mirror and the filter-detector so that the hyperbolic mirror and the Winston cone direct incoming IR light beams reflected from one of the retroreflectors onto the filter-detector, the filter-detector configured to measure a methane gas concentration in an environment by measuring an absorption of infrared radiation of the methane gas at specific wavelength bandwidths.

13. The methane leak detection system as defined in claim 12, wherein each of the methane alert stations further comprises a plurality of infrared collimating lenses, each lens disposed within the casing between one of the pulsed infrared light sources and one of the IR transmitting windows.

14. The methane leak detection system as defined in claim 13, wherein the filter-detector comprises a filter section including at least one bandpass spectral filter, and a sensor section including at least one sensor configured to detect a methane gas concentration.

15. The methane leak detection system as defined in claim 13, wherein the filter-detector is a quad filter-detector comprising a filter section and a sensor section, wherein the filter section includes four bandpass spectral filters, and wherein the sensor section includes four sensors configured to detect a methane gas concentration.

16. The methane leak detection system as defined in claim 12, wherein the IR transmitting windows are disposed in some but not all of the window openings.

17. A method for monitoring an environment for methane leaks, the method comprising the steps of:
dividing the environment into a plurality of grid sites, each site including a potential source of methane leak;
placing at least one retroreflector in each of the grid sites;
placing a methane alert station in each of the grid sites so that each of the potential sources of methane leak is disposed between a methane alert station and at least one of the retroreflectors, each of the methane alert stations comprising:
each of the methane alert stations comprising:
a casing having a central axis; a plurality of window openings formed in the casing around the central axis;
a plurality of infrared (IR) transmitting windows each disposed in one of the window openings in the casing;
a plurality of pulsed infrared light sources each disposed adjacent to one of the infrared transmitting windows within the casing, each of the pulsed infrared light sources configured to emit an outgoing infrared light from the casing through one of the infrared transmitting windows toward one of the retroreflectors;
a hyperbolic mirror disposed in the casing coaxially with the central axis;
a Winston cone disposed coaxially with the central axis and spaced from the hyperbolic mirror along the central axis; and
a filter-detector arranged coaxially with the central axis and so that the Winston cone is disposed between the hyperbolic mirror and the filter-detector so that the hyperbolic mirror and the Winston cone direct incoming IR light beams reflected from one of the retroreflectors onto the filter-detector, the filter-detector configured to measure a methane gas concentration in an environment by measuring an absorption of infrared radiation of the methane gas at specific wavelength bandwidths;
sequentially emitting outgoing IR light beams of each of the methane alert stations through one of the IR transmitting windows thereof toward one of the retroreflectors; and
directing an incoming IR light beam reflected from the at least one of the retroreflectors onto the filter-detector.

18. The method as defined in claim 17, wherein each of the methane alert stations further comprises a plurality of infrared collimating lenses, each lens disposed within the casing between one of the pulsed infrared light sources and one of the IIS transmitting windows.

19. The methane leak detection system as defined in claim 17, wherein the filter-detector comprises a filter section including at least one bandpass spectral filter, and a sensor section including at least one sensor configured to detect a methane gas concentration.

20. The methane leak detection system as defined in claim 17, wherein the filter-detector is a quad filter-detector comprising a filter section and a sensor section, wherein the filter section includes four bandpass spectral filters, and wherein the sensor section includes four sensors configured to detect a methane gas concentration.

* * * * *